US00RE43670E

(19) United States
(12) Reissued Patent
Webster et al.

(10) Patent Number: US RE43,670 E
(45) Date of Reissued Patent: Sep. 18, 2012

(54) SINGLE-CARRIER TO MULTI-CARRIER WIRELESS ARCHITECTURE

(75) Inventors: Mark A. Webster, Indian Harbour Beach, FL (US); Michael J. Seals, Melbourne, FL (US)

(73) Assignee: Intellectual Ventures I LLC, Wilmington, DE (US)

(21) Appl. No.: 12/319,707

(22) Filed: Jan. 9, 2009 (Under 37 CFR 1.47)

Related U.S. Patent Documents

Reissue of:
(64) Patent No.: 7,161,987
Issued: Jan. 9, 2007
Appl. No.: 10/191,901
Filed: Jul. 9, 2002

U.S. Applications:
(63) Continuation-in-part of application No. 10/143,134, filed on May 10, 2002, now Pat. No. 6,754,195.

(60) Provisional application No. 60/325,048, filed on Sep. 26, 2001.

(51) Int. Cl.
*H04L 27/28* (2006.01)

(52) U.S. Cl. ..... 375/260

(58) Field of Classification Search ..... 375/219, 375/279, 280, 316, 329, 371, 364, 369; 370/203, 370/204, 205, 276, 277, 278, 297, 464, 468, 370/478, 480, 482
See application file for complete search history.

(56) References Cited

U.S. PATENT DOCUMENTS 5,241,545 A 8/1993 Kazecki et al.
5,425,050 A 6/1995 Schreiber et al.
6,067,391 A 5/2000 Land
6,128,276 A 10/2000 Agee
6,298,035 B1 10/2001 Heiskala
6,344,807 B1 2/2002 Hasner et al.
(Continued)

FOREIGN PATENT DOCUMENTS

JP 2000 101623 A 4/2000
(Continued)

OTHER PUBLICATIONS

Baldwin et al., IEEE P802.11 Wireless LANs CCK-OFDEM Proposed Normative Text, Jul. 10, 2001 XP002242971, Retrieved from the internet: http://grouper.ieee.org/groups/802/11/Documents/D1T401-450.html, pp. 52-56.

(Continued)

*Primary Examiner* — Khanh C Tran

(57) ABSTRACT

A Baseband receiver including a CIR estimate block, gain, phase and timing loops, a CMF, a single-carrier processor and a multi-carrier processor. The CIR estimate block generates an impulse response signal based on a receive signal that is a single-carrier signal or a single-carrier segment of a mixed carrier signal. The single-carrier segment has a spectrum that approximates a multi-carrier spectrum. The gain, phase and timing loops adjust gain, phase, frequency and timing to provide an adjusted receive signal. The CMF filters the adjusted receive signal according to the impulse response signal. The single-carrier processor processes the adjusted and filtered receive signal to resolve a single-carrier segment of a mixed carrier signal. The single-carrier processor detects a mixed carrier mode indication in a single-carrier segment and asserts a start indication. The multi-carrier processor processes a multi-carrier segment of a mixed carrier signal in response to assertion of the start indication.

78 Claims, 10 Drawing Sheets

U.S. PATENT DOCUMENTS

| | | | | |
|---|---|---|---|---|
| 6,369,758 | B1 | 4/2002 | Zhang | |
| 6,434,119 | B1 | 8/2002 | Wiese et al. | |
| 6,563,858 | B1 | 5/2003 | Fakatselis et al. | |
| 6,567,374 | B1 | 5/2003 | Bohnke et al. | |
| 6,647,077 | B1 | 11/2003 | Shan et al. | |
| 6,754,170 | B1 | 6/2004 | Ward | |
| 6,850,493 | B1 | 2/2005 | Ojard et al. | |
| 6,912,261 | B2 | 6/2005 | Aslanis et al. | |
| 7,009,932 | B2 | 3/2006 | Matheus et al. | |
| 7,010,062 | B2 | 3/2006 | Joshi et al. | |
| 7,203,156 | B1 * | 4/2007 | Fukuda | 370/203 |
| 2001/0024475 | A1 | 9/2001 | Kumar | |
| 2001/0055295 | A1 | 12/2001 | Akiyama et al. | |
| 2002/0012337 | A1 | 1/2002 | Schmidl et al. | |
| 2002/0122381 | A1 | 9/2002 | Wu et al. | |
| 2002/0136331 | A1 | 9/2002 | Wilhelmsson et al. | |
| 2002/0176510 | A1 | 11/2002 | Laroia | |
| 2006/0176968 | A1 | 8/2006 | Keaney et al. | |

FOREIGN PATENT DOCUMENTS

| | | |
|---|---|---|
| JP | 2000101623 | 4/2000 |
| WO | 03/005652 | 1/2003 |
| WO | WO 03 005652 A | 1/2003 |
| WO | 03/028329 | 4/2003 |

OTHER PUBLICATIONS

Crochiere et al., "Interpolation and Decimation of Digital Signals—A Tutorial Review," Proceeding of the IEEE, New York, US, vol. 69, No. 3, Mar. 1, 1981, pp. 300-331, XP00615159, ISSN: 0018-9219, p. 201, left-hand column, last paragraph—right-hand column, paragraph 5, figures 15, 18 and 20A, secino II-B, Section III-C.

Adams, R.: "Asynchronous Conversion Thwarts Incompatibility in Sampling A/D Systems," EDN Electrical Design News, Cahners Publishing Co. Newton, Massachusetts, US, vol. 39, No. 15, Jul. 21, 1994, pp. 83-88, XP000491539, ISSN: 0012-7515, section "Synchronous rate-conversion theory".

International Search Report for PCT/US02/30411 dated Jun. 3, 2003.

International Search Report for PCT/US02/21092 dated Mar. 24, 2003.

Deneire et al., "Training Sequence vs. Cyclic Prefix A new look on Single Carrier Communication," IEEE Global Telecommunications Conference, vol. 2 of 4, Nov. 27, 2000-Dec. 1, 2000, pp. 1056-1060, XP001017246, New York, US, ISBN: 0-7803-6542-X.

Webster et al., "Reuse of 802.11 Preambles with HRb OFDM," IEEE 802.11-00/390, Nov. 1, 2000, pp. 1-36, XP002217331.

van Nee et al., "New High-Rate Wireless Lan Standards," IEEE Communications Magazine, IEEE Service Center, Piscataway, N.J., U.S., vol. 37, No. 12, Dec. 1999, pp. 82-88, XP000908328.

"Supplement to IEEE standard for information technology—telecommunications and information exchange between systems—local and metropolitan area networks—specific requirements. Part 11: wireless LAN Medium Access Control (MAC) and Physical Layer (PHY) specifications: high-speed physical layer in the 5 GHZ Band." IEEE STD. 802.11A-1999, Dec. 30, 1999, pp. 1-90, XP0021899725.

International Search Report for PCT/US02/21095 dated Nov. 12, 2002.

"Draft Supplement to Standard [for] Information Technology—Telecommunications and Information exchange between systems—Local and metropolitan area networks—Specific Requirements—Part 11: Wireless LAN Medium Access Control (MAC) and Physical Layer (PHY) in the 5 GHz Band," IEEE P 802.11a/D7.0 (Supplement to IEE Std. 802.11-1999), Jul. 1999, 90 pages.

"Draft Supplement to Standard [for] Information Technology—Telecommunications and Information exchange between systems—Local and metropolitan area networks—Specific Requirements—Part 11: Wireless LAN Medium Access Control (MAC) and Physical Layer (PHY) specifications: Higher speed Physical Layer (PHY) extension in the 2.4 GHz band," IEEE Std 802.11b/D7.0 (Draft Supplement to IEEE Std 802.11 1999 Edition), Jul. 1999, 94 pages.

"Information Technology—Telecommunications and Information exchange between systems—Local and metropolitan area networks—Specific Requirements—Part 11: Wireless LAN Medium Access Control (MAC) and Physical Layer (PHY) Specifications," ISO/IEC 8802-11:1999(E) ANSI/IEEE Std 802.11, 1999 Edition, Aug. 1999, 531 pages.

International Preliminary Examination Report for PCT/US2002/021095, completed Jul. 3, 2003.

International Preliminary Examination Report for PCT/US2002/030411, completed Mar. 27, 2006.

Steve, Halford et al.: "IEEE P802.11 Wireless LANs, CCK-OFDM Proposed Normative Text," Jul. 10, 2001, XP002242971, Retrieved from the Internat: <URL: http://grouper.ieee.org/groups/802/11/Documents/D1T401-450.html>, pp. 52-66.

Crochiere R E et al.: "Interpolation and Decimation of Digital Signals—A Tutorial Review," Proceeding of the IEEE, IEEE. New York, US, vol. 69, No. 3, Mar. 1, 1981, pp. 300-331, XP000615159, ISSN: 0018-9219, p. 301, left-hand column, last paragraph—right-hand column, paragraph 5, figures 15, 18 and 20A, section II-B, section III-C.

Adams R: "Asynchronous Conversion Thwarts Incompatibility in Sampling A/D Systems" EDN Electrical Design News, Cahners Publishing Co. Newton, Massachusetts, US, vol. 39, No. 15, Jul. 21, 1994, pp. 83-88, XP000491530, ISSN: 0012-7515, section "Synchronous rate-conversion theory".

PCT Notification of Transmittal of the International Search Report or the Declaration, dated Jun. 30, 2003, 5 pages.

PCT Notification of Transmittal of International Preliminary Examination Report, 7 pages.

PCT Notification of Transmittal of the International Search Report or the Declaration dated Mar. 24, 2003, 5 pages.

Webster, Mark and Halford, Steve, "Reuse of 802.11 Preambles with HRb OFDM," IEEE 802.11-00/390, Nov. 1, 2000, pp. 1-36, XP002217331.

Lambrette U., et al., "OFDM Burst Frequency Synchronization by Single Carrier Training Data," IEEE Communications Letters, IEEE Service Center, Piscataway, U.S., vol. 1, No. 2, Mar. 1, 1997, pp. 46-48, XP000687090.

Nee Van R., et al, "New High-Rate Wireless Lan Standards" IEEE Communication Magazine, IEEE Service Center, Piscataway, N.J., U.S., vol. 37, No. 12, Dec. 1999, pp. 82-88, XP000908328.

PCT Notification of Transmittal of the International Search Report or the Declaration, dated Nov. 12, 2002, 4 pages.

Written Opinion, dated Aug. 13, 2002, 4 pages.

* cited by examiner

SINGLE-CARRIER TO MULTI-CARRIER WIRELESS ARCHITECTURE

Matter enclosed in heavy brackets [ ] appears in the original patent but forms no part of this reissue specification; matter printed in italics indicates the additions made by reissue.

CROSS-REFERENCE TO RELATED APPLICATION(S)

[The present application is based on U.S. Provisional Patent Application entitled "Single-Carrier to Multi-Carrier Wireless Architecture", Ser. No. 60/325,048, filed Sep. 26, 2001, which is hereby incorporated by reference in its entirety. The present application is also a continuation-in-part (CIP) of U.S. patent application entitled "Wireless Communication System Configured to Communicate Using a Mixed Waveform Configuration", Ser. No. 10/143,134, filed May 10, 2002, which is hereby incorporated by reference in its entirety.] *The present application is a Reissue Application of U.S. patent application Ser. No. 10/191,901, filed Jul. 9, 2002 and now U.S. Pat. No. 7,161,987, which is a Continuation-in-part (CIP) of U.S. patent application Ser. No. 10/143,134, filed May 10, 2002 now U.S. Pat. No. 6,754,195, which claims the benefit of U.S. Provisional Patent Application No. 60/325,048, filed Sep. 26, 2001, each of which is hereby incorporated by reference in its entirety.*

FIELD OF THE INVENTION

The present invention relates to wireless communications, and more particularly to a wireless communication architecture configured to communicate using a single-carrier to multi-carrier mixed waveform configuration.

BACKGROUND OF THE INVENTION

The Institute of Electrical and Electronics Engineers, Inc. (IEEE) 802.11 standard is a family of standards for wireless local area networks (WLAN) in the unlicensed 2.4 and 5 Gigahertz (GHz) bands. The current IEEE 802.11b standard defines various data rates in the 2.4 GHz band, including data rates of 1, 2, 5.5 and 11 Megabits per second (Mbps). The 802.11b standard uses direct sequence spread spectrum (DSSS) with a chip rate of 11 Megahertz (MHz), which is a serial modulation technique. The IEEE 802.11a standard defines different and higher data rates of 6, 12, 18, 24, 36 and 54 Mbps in the 5 GHz band. It is noted that systems implemented according to the 802.11a and 802.11b standards are incompatible and will not work together.

A new IEEE standard is being proposed, referred to as 802.11g (the "802.11g proposal"), which is a high data rate extension of the 802.11b standard at 2.4 GHz. It is noted that, at the present time, 802.11g is only a proposal and is not yet a completely defined standard. Several significant technical challenges are presented for the new 802.11g proposal. It is desired that the 802.11g devices be able to communicate at data rates higher than the standard 802.11b rates in the 2.4 GHz band. In some configurations, it is desired that the 802.11b and 802.11g devices be able to coexist in the same WLAN environment or wireless area without significant interference or interruption from each other, regardless of whether the 802.11b and 802.11g devices are able to communicate with each other. Thus, it is desired that 802.11g be backwards compatible with 802.11b devices. It may further be desired that the 802.11g and 802.11b devices be able to communicate with each other, such as at any of the standard 802.11b rates.

An impairment to wireless communications, including WLANs, is multi-path distortion where multiple echoes (reflections) of a signal arrive at the receiver. Both the single-carrier systems and multi-carrier systems must include equalizers that are designed to combat this distortion. The equalizer of the single-carrier system is designed based on its preamble and header. Other types of interferences, such as different and incompatible wireless signal types, may cause problems with WLAN communications. The Bluetooth standard, for example, defines a low-cost, short-range, frequency-hopping WLAN. Systems implemented according to the Bluetooth standard present a major source of interference for 802.11-based systems. Preambles are important for good receiver acquisition. Hence, losing all information when transitioning from single-carrier to multi-carrier is not desirable in the presence of multi-path distortion or other types of interference.

There are several potential problems with the signal transition, particularly with legacy equipment. The transmitter may experience analog transients (e.g., power, phase, filter delta), power amplifier back-off (e.g. power delta) and power amplifier power feedback change. The receiver may experience Automatic Gain Control (AGC) perturbation due to power change, spectral change, multi-path effects, loss of channel impulse response (CIR) (multi-path) estimate, loss of carrier phase, loss of carrier frequency, and loss of timing alignment.

A mixed waveform configuration for wireless communications has been previously disclosed in U.S. Provisional Patent Application entitled, "Wireless Communication System Configured to Communicate Using a Mixed Waveform Configuration", Ser. No. 60/306,438 filed on Jul. 6, 2001, which is also incorporated by reference in its entirety. The system described therein reused the equalizer information obtained during acquisition of the single-carrier portion of the signal. The technique provided continuity between the single-carrier and multi-carrier segments (e.g., orthogonal frequency division multiplexing or OFDM), which was achieved by specifying the transmit waveform completely for both the single-carrier and multi-carrier segments and specifying the transition. The waveform enabled continuity between the two signal segments, including AGC (power), carrier phase, carrier frequency, timing and spectrum (multi-path). It was contemplated that the signal would not have to be reacquired by the multi-carrier portion of the receiver since the information developed during the single-carrier portion (preamble/header) was valid and used to initiate capture of the multi-carrier portion. However, particular receiver architectures were not discussed.

A mixed carrier transmitter is described herein that is capable of communicating using the proposed mixed carrier waveform configuration. The term "mixed carrier" as used herein refers a combined signal with a single-carrier portion followed by a multi-carrier portion. The transmitter may be configured to operate in multiple operating modes including single-carrier, mixed carrier and multi-carrier modes. Furthermore, several receiver architectures are described that are configured to receive a mixed carrier signal and resolve the incorporated Baseband signals incorporated in the mixed carrier signal.

SUMMARY OF THE PRESENT INVENTION

A Baseband receiver according to an embodiment of the present invention includes a channel impulse response (CIR)

estimate block, gain, phase and timing loops, a channel matched filter (CMF), a single-carrier processor and a multi-carrier processor. The CIR estimate block is capable of generating an impulse response signal based on a receive signal that is a single-carrier signal or a single-carrier segment of a mixed carrier signal in which the single-carrier segment has a spectrum that approximates a multi-carrier spectrum. The gain, phase and timing loops adjust gain, phase, frequency and timing of a receive signal to provide an adjusted receive signal. The CMF filters the adjusted receive signal according to the impulse response signal. The single-carrier processor processes the adjusted and filtered receive signal to resolve a single-carrier segment of a mixed carrier signal. The single-carrier processor is capable of detecting a mixed carrier mode indication in a single-carrier segment and asserting a start indication corresponding to the end of the single-carrier segment. The multi-carrier processor is capable of processing a multi-carrier segment of a mixed carrier signal in response to assertion of the start indication.

In a particular embodiment, a selected one of Binary Phase Shift Keying (BPSK) and Quadrature Phase Shift Keying (QPSK) is used for modulation of the single-carrier segment and orthogonal frequency division multiplexing (OFDM) is used for modulation of the multi-carrier segment of a mixed carrier signal.

The Baseband receiver may include control logic that selects between single-carrier, multi-carrier and mixed carrier modes of operation. In this configuration, the single-carrier processor is configured to process adjusted and filtered receive signals of a single-carrier signal in the single-carrier mode of operation and to process a single-carrier segment of adjusted and filtered receive signals of a mixed carrier signal in the mixed carrier mode of operation. Also, the multi-carrier processor is configured to process multi-carrier receive signals prior to adjustment and filtering in the multi-carrier mode of operation and to process a multi-carrier segment of a mixed carrier signal in the mixed carrier mode of operation. The multi-carrier processor may operate in a non-coherent mixed carrier mode in which it processes multi-carrier segments of receive signals prior to adjustment and filtering. In this non-coherent mode, the multi-carrier segments may include a synchronization field where the multi-carrier processor determines frequency domain equalizer taps from the synchronization field. The gain, phase and timing loops may develop gain, phase, frequency and timing adjust parameters, where the multi-carrier processor is configured to be programmable with a selected combination of the gain, phase, frequency and timing adjust parameters. The multi-carrier processor may further include a phase locked loop with a filter that is configured to be programmable with the frequency adjust parameter. In this case, the multi-carrier processor may include a timing loop that is configured to be programmable with the timing adjust parameter.

The single-carrier processor may assert a freeze indication to the gain, phase and timing loops in response to detecting the mixed carrier mode indication, where the freeze indication suspends operation of the timing, gain and phase loops at an end of the single-carrier segment of a mixed carrier signal. The Baseband receiver may further include a Fast Fourier Transform (FFT) generator and a frequency domain equalizer. The FFT generator converts the impulse response signal into a frequency response signal that is provided to the frequency domain equalizer. The frequency domain equalizer determines multi-carrier equalization signals based on the frequency response signal. The multi-carrier processor, in response to assertion of the start indication, processes multi-carrier segments of adjusted and filtered receive signals uses the multi-carrier equalization signals. In one configuration, the multi-carrier processor is coupled to an output of the CMF, and the frequency domain equalizer determines multi-carrier equalization signals $FEQ(\omega_k)$ based on the frequency response signal $H(\omega_k)$ according to the equation $FEQ(\omega_k)=1/(abs(H(\omega_k))^2$, where "abs" is the absolute value function. In an alternative embodiment, the multi-carrier processor is coupled to an input of the CMF, the single-carrier processor asserts the start indication before an end of the single-carrier segment by a CMF latency period, and the frequency domain equalizer determines multi-carrier equalization signals according to the equation $FEQ(\omega_k)=1/H(\omega_k)$.

The phase loop may include a phase error detector that generates a phase error signal, a phase filter that receives the phase error signal and that generates a phase correction signal, and a phase rotator that adjusts the received signal based on the phase correction signal. The phase correction signal is held constant upon assertion of the freeze indication. The phase error detector may set the phase error signal to zero upon assertion of the freeze indication to hold the phase correction signal constant. The gain loop may include a gain error detector that generates a gain error signal, an integrator that receives the gain error signal and that generates a gain correction signal, and a multiplier that adjusts the receive signal based on the gain correction signal. The gain correction signal is held constant upon assertion of the freeze indication. The gain error detector may set the gain error signal to zero upon assertion of the freeze indication to hold the gain correction signal constant. The timing loop may include a time track block that receives and adjusts timing of the receive signal and that suspends tracking adjustments of the receive signal upon assertion of the freeze indication. The Baseband multi-carrier processor may include a combiner that combines the multi-carrier equalization signals from the frequency domain equalizer with a frequency response signal based on a received multi-carrier signal.

The Baseband receiver may include control logic that selects between single-carrier, multi-carrier and mixed carrier modes of operation, where the single-carrier processor is configured to process adjusted and filtered receive signals of a single-carrier signal in the single-carrier mode of operation and to process a single-carrier segment of an adjusted and filtered receive signals of a mixed carrier signal in the mixed carrier mode of operation, and where the multi-carrier processor is configured to process multi-carrier receive signals prior to adjustment and filtering in the multi-carrier mode of operation and to process a multi-carrier segment of adjusted and filtered receive signals of a mixed carrier signal in the mixed carrier mode of operation.

A wireless radio frequency (RF) communication device according to an embodiment of the present invention includes an RF transceiver, a Baseband transmitter and a Baseband receiver. The RF transceiver converts RF signals from an antenna to Baseband signals and converts Baseband signals to RF signals for transmission via the antenna. The Baseband transmitter is configured to transmit a mixed carrier signal via the RF transceiver by modulating a single-carrier section using single-carrier modulation and by modulating a multi-carrier section using multi-carrier modulation. The transmitter filters the single-carrier section to approximate a multi-carrier power spectrum and formulates the mixed carrier signal to maintain frequency, phase, gain and timing coherency between the single-carrier and multi-carrier sections. The Baseband receiver is implemented in a similar manner described above.

The RF transceiver may be capable of multi-band operation, where the RF transceiver operates in a first RF frequency band for the single-carrier and mixed carrier modes, and where the RF transceiver operates in a selected one of multiple frequency bands including the first frequency band and a second RF frequency band for the multi-carrier mode. In a specific embodiment, the first RF frequency band is approximately 2.4 gigahertz (GHz) and the second RF frequency band is approximately 5 GHz.

The Baseband transmitter may include a single-carrier transmit processor that generates a single-carrier signal, a multi-carrier transmit processor that generates a multi-carrier signal, a digital filter and a signal combiner. The digital filter filters the single-carrier signal to have a power spectrum that approximates a multi-carrier power spectrum. The signal combiner combines the filtered single-carrier signal with the multi-carrier signal while maintaining phase, gain and timing alignment. The signal combiner may include a phase multiplier, a digital combiner and a soft switch. The phase multiplier multiplies the multi-carrier signal by a phase of a last portion of the single-carrier section and provides a rotated multi-carrier signal. The digital combiner combines the filtered single-carrier signal and the rotated multi-carrier signal and provides a combined mixed carrier signal. The soft switch selects the filtered single-carrier signal until completed, selects the combined mixed carrier signal during a transition period, and selects the rotated multi-carrier signal at the end of the transition period. The single-carrier signal may include consecutive chips according to a predetermined timing interval, where the transition period has a duration equivalent to the predetermined timing interval.

A method of generating a mixed carrier packet for RF transmission according to an embodiment of the present invention includes generating a multi-carrier payload using a selected multi-carrier modulation scheme, generating a single-carrier segment including a preamble and header using a single-carrier modulation scheme, filtering the single-carrier segment to have a power spectrum that approximates a power spectrum of the multi-carrier modulation scheme, and combining the filtered single-carrier segment with the multi-carrier payload in such a manner to maintain gain, phase, frequency and timing across a transition to provide a carrier packet.

The combining may include rotating the multi-carrier payload by a phase determined from the filtered single-carrier segment. The single-carrier modulation scheme may be Barker modulation and the multi-carrier modulation scheme may be according to OFDM, where the rotating includes rotating an OFDM multi-carrier payload by a phase of a last Barker Word of the filtered single-carrier segment. The multi-carrier payload may include an OFDM preamble. The combining may further include ramping the filtered single-carrier segment down while ramping the multi-carrier payload up during the transition. The filtered single-carrier segment may have a predetermined chip rate, in which case the method may further include sampling the filtered single-carrier segment and the multi-carrier payload by a predetermined sampling rate, and asserting a first full sample of the multi-carrier payload after a last full sample of the filtered single-carrier segment by a transition time period based on the predetermined chip rate of the filtered single-carrier segment. The combining may further include combining proportions of each of the filtered single-carrier segment and the multi-carrier payload to provide multiple samples during the transition time. In one configuration, the predetermined sampling rate is four times the predetermined chip rate, in which case the combining proportions during the transition time includes providing a first, second and third intermediate samples with filtered single-carrier segment to multi-carrier payload percentages of 75/25, 50/50 and 25/75, respectively.

A method of acquiring a mixed carrier signal having a single-carrier segment followed by a multi-carrier segment according to an embodiment of the present invention includes determining gain, phase, frequency and timing adjust parameters of a received Baseband signal, adjusting the Baseband signal using the adjust parameters to provide an adjusted Baseband signal, determining a CIR estimate while receiving a single-carrier segment of the received Baseband signal, filtering the adjusted Baseband signal based on the CIR estimate to provide a filtered and adjusted Baseband signal, processing the filtered and adjusted Baseband signal using a single-carrier processor to acquire the single-carrier segment, detecting a mixed carrier mode identifier in the single-carrier segment and asserting a mixed mode indication, and, in response to the mixed mode indication, processing the received Baseband signal using a multi-carrier processor to acquire the multi-carrier segment.

The processing the received Baseband signal using a multi-carrier processor may include processing the received Baseband signal prior to adjusting and filtering. The method may further include determining, by the multi-carrier processor, a second channel frequency response estimate from a preamble section of the multi-carrier segment, and filtering the multi-carrier segment based on the second frequency response estimate. The method may further include using, by the multi-carrier processor, any selected combination of the gain, phase, frequency and timing adjust parameters as at least one starting parameter for acquiring the multi-carrier segment.

A method of acquiring a mixed carrier signal having a single-carrier segment followed by a multi-carrier segment according to another embodiment of the present invention includes determining gain, phase, frequency and timing adjust parameters of a received Baseband signal, adjusting the Baseband signal using the adjust parameters to provide an adjusted Baseband signal, determining a CIR estimate while receiving a single-carrier segment of the received Baseband signal, converting the CIR estimate to a frequency response signal, programming a frequency domain equalizer using the frequency response signal, filtering the adjusted Baseband signal based on the CIR estimate to provide a filtered and adjusted Baseband signal, processing the filtered and adjusted Baseband signal using a single-carrier processor to acquire the single-carrier segment, detecting a mixed carrier mode identifier in the single-carrier segment and asserting a mixed mode indication and a freeze indication, and, in response to the freeze indication, holding the gain, phase, frequency and timing adjust parameters constant, and, in response to the mixed mode indication, processing the filtered and adjusted Baseband signal with a multi-carrier processor that employs the frequency domain equalizer to acquire the multi-carrier segment. The determining gain, phase, frequency and timing adjust parameters may include determining gain, phase, frequency and timing error values. The holding the gain, phase, frequency and timing adjust parameters constant may include setting the gain, phase, frequency and timing error values to zero.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF EMBODIMENT(S) OF THE INVENTION

Figure 1:
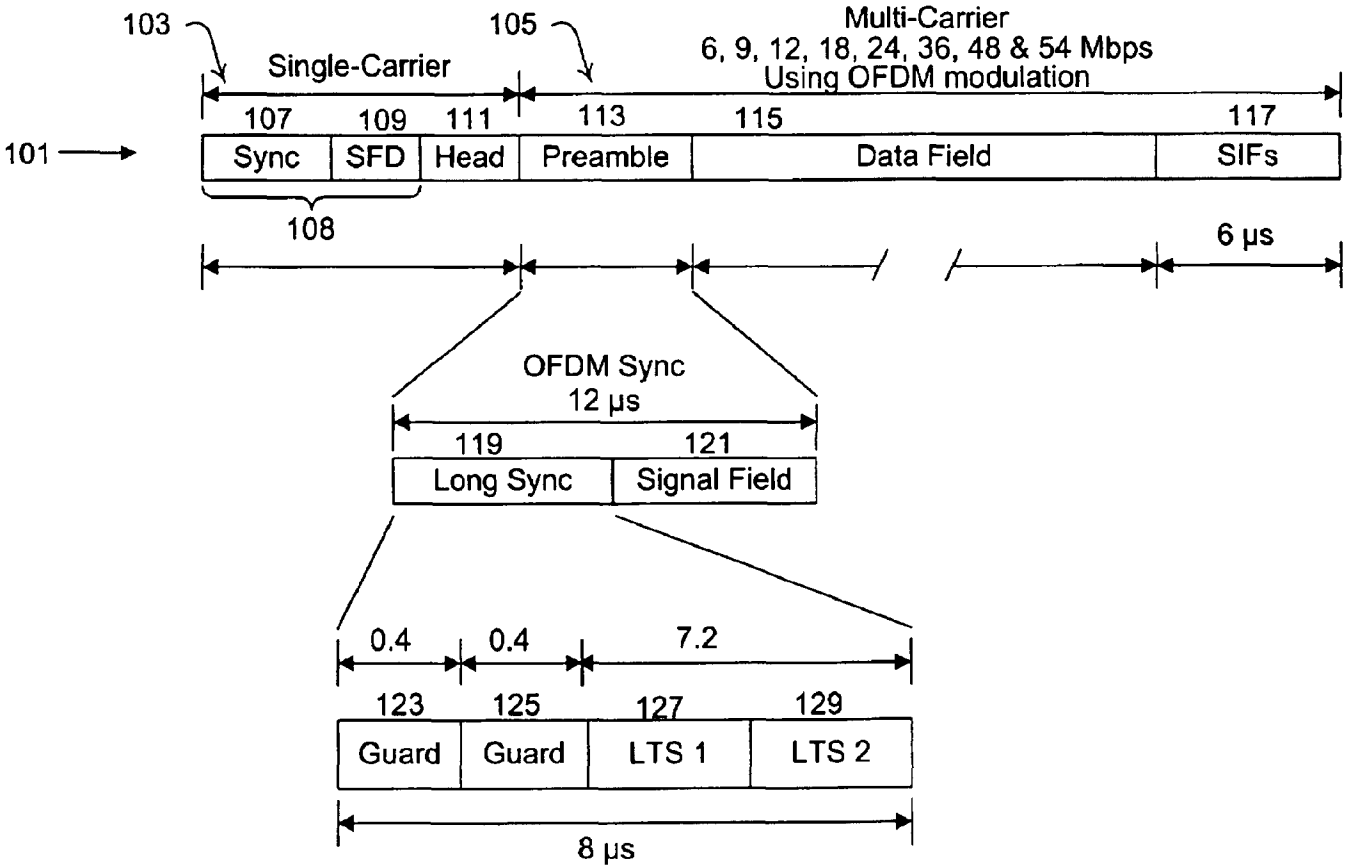
FIG. 1 is a conceptual diagram of a mixed signal packet implemented according to an embodiment of the present invention.

A Baseband transmitter and receiver architecture according to one embodiment of the present invention achieves coherency across the single-carrier to multi-carrier transition by maintaining gain, phase, frequency, sample timing and Channel Impulse Response (CIR) from the single-carrier signal to the multi-carrier signal of a mixed carrier signal. In this manner, the signal does not have to be reacquired by the multi-carrier portion of the receiver since the information developed during the single-carrier portion is valid and used to initiate capture of the multi-carrier portion. Maintaining and accumulating information makes the signal much more robust in the face of common interferences experienced in wireless communications. A Baseband receiver architecture according to an alternative embodiment is also described that does not preserve the coherency across the transition, so that the multi-carrier portion of the receiver must completely reacquire the signal after the transition. Yet another non-coherent receiver embodiment is disclosed that utilizes selected information gained from the single-carrier portion of the waveform, such as any selected parameter associated with gain, phase, frequency or timing. Although the non-coherent architectures are less robust than the coherent configurations, the non-coherent options may be easier and cheaper to implement while remaining sufficiently robust to achieve a suitable communication system for many applications.

The wireless devices described herein operate in the 2.4 GHz band in 802.11b or 802.11g modes or in any of several bands (multi-band) in one or more 802.11a modes, such as 2.4 GHz, 5 GHz, or any other suitable band. The devices may be configured in any suitable format, such as any type of computer (desktop, portable, laptop, etc.), any type of compatible telecommunication device, any type of personal digital assistant (PDA), or any other type of network device, such as printers, fax machines, scanners, hubs, switches, routers, etc. It is noted that the present invention is not limited to the 802.11g proposal, the 802.11b standard, the 802.11a standard or the 2.4 GHz frequency band, although these standards and frequencies may be utilized in certain embodiments. The wireless devices may be configured to communicate with each other at any of the standard 802.11b rates, including 1, 2, 5.5 and 11 Mbps to maintain backwards compatibility with 802.11b devices. The wireless devices may also be configured for mixed carrier mode operation to enable communications at different or higher data rates using a mixed signal configuration according to any one of several embodiments, such as the standard 802.11a data rates of 6, 9, 12, 18, 24, 36, 48 or 54 Mbps.

The mixed signal devices may operate and/or coexist in the same wireless operating area as 802.11b devices without significant interference with each other even while operating in mixed signal mode.

FIG. 1 is a conceptual diagram of a mixed signal packet 101 implemented according to an embodiment of the present invention. The packet 101 includes a single-carrier section 103 followed by a multi-carrier section 105. The single-carrier section 103 is intended to be modulated by a single-carrier modulation scheme and the multi-carrier section 105 is intended to by modulated by a multi-carrier modulation scheme. In the embodiments described herein, the single-carrier modulation is Quadrature Phase Shift Keying (QPSK) symbol rate or Binary Phase Shift Keying (BPSK), such as according to the 802.11b standard, and the multi-carrier modulation is according to OFDM, such as according to the 802.11a standard. It is understood and appreciated that other single-carrier and multi-carrier modulation schemes may be used.

In the embodiment shown, the single-carrier section 103 includes a Barker preamble 108 followed by a Barker header 111. The Barker preamble 108 includes a Sync field 107 followed by a Sync Field Delimiter (SFD) 109 and is 30 configured according to 802.11b for Barker Word modulation. The preamble 108 and the Barker header 111 may be modulated according to BPSK or QPSK and thus may be transmitted at 1 or 2 megabits per second (Mbps). A long version of the single-carrier section 103 is transmitted in 192 microseconds (μs) and a short version is transmitted in 96 μs. The multi-carrier portion 105 includes a preamble 113, a data field 115 and a SIFs Pad 117. The data field 115 is transmitted at a selected data rate from among typical data rates of 6, 9, 12, 18, 24, 36, 48 or 54 Mbps using OFDM modulation. The SIFs pad is transmitted in 6 μs.

The preamble 113 is used for synchronization for OFDM modulation, and includes a long sync field 119 and a signal field 121. The preamble 113 is transmitted in approximately 12 μs. The long sync field 119 includes a pair of 0.8 μs guard intervals 123, 125 and a pair of 3.6 μs long training symbols 127, 129. In this manner, it is appreciated that the total duration of the long sync field 119 is 8 μs, which is significantly shorter than the short or long versions of the single-carrier section 103 consuming at least 96 μs.

Figure 2:
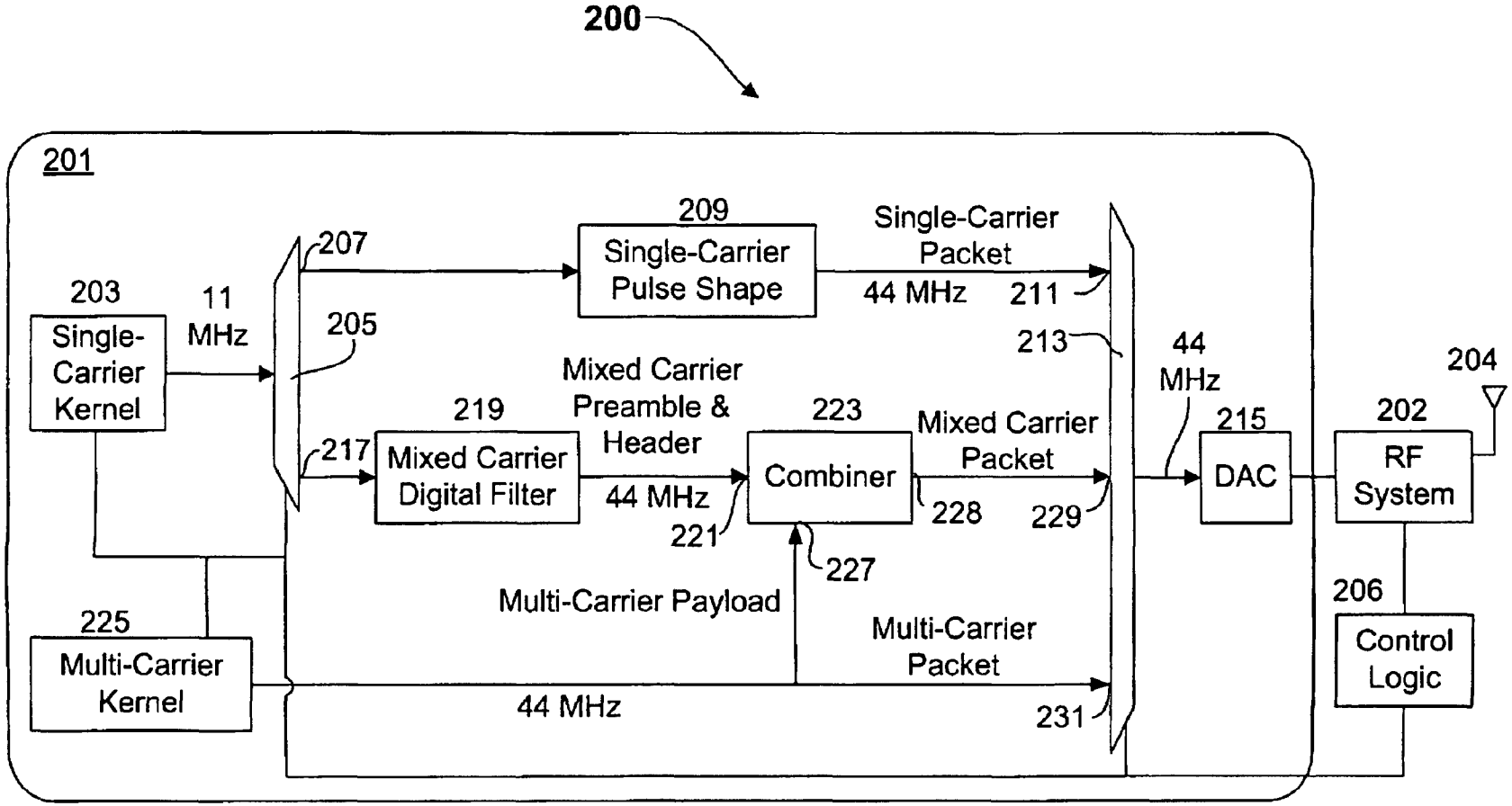
FIG. 2 is a simplified block diagram of a mixed carrier signal transmitter including a Baseband transmitter implemented according to an embodiment of the present invention.

FIG. 2 is a simplified block diagram of a mixed carrier signal transmitter 200 including a Baseband transmitter 201 implemented according to an embodiment of the present invention. In one embodiment, the transmitter 201 is configured to operate in several modes, including a single-carrier mode (e.g. 802.11b), a mixed carrier mode (802.11g), and several multi-carrier modes (e.g. 802.11a). The multi-carrier modes may employ OFDM modulation in any one of several frequency bands, such as the 2.4 or 5 GHz bands. A single-carrier processor or kernel 203 incorporates the core processing functions to configure single-carrier signals at a selected chip rate, such as Barker chips at 11 MHz. The output of the kernel 203 is provided to the input of a 1:2 splitter 205. A first output 207 of the splitter 205 is provided to the input of an single-carrier pulse shape block 209 (digital filter), which outputs a single-carrier packet at a sample rate of 44 MHz. The output of the single-carrier pulse shape block 209 is provided to a first input 211 of a 3:1 multiplexor (MUX) 213, having its output coupled to the input of a digital to analog converter (DAC) 215.

The analog output of the DAC 215 is mixed with a radio frequency (RF) signal and transmitted in a wireless medium via an antenna 204 as known to those skilled in the art. In the embodiment shown, the analog output of the DAC 215 is provided to an RF system 202, which converts the Baseband signal to an RF signal that is asserted in the wireless medium via the antenna. The transmitter 200 also includes control logic 206 coupled to the RF system 202 and the Baseband transmitter 201 to control operation and to control the particular mode of operation. The control logic 206 controls the splitter 205 and the MUX 213 to select single-carrier packets for the single-carrier mode, to select multi-carrier packets for the multi-carrier mode, and to select mixed carrier packets for the mixed carrier mode of operation.

The RF system 202 and the control logic 206 may further be configured for multi-band operation. The RF system 202 may be configured to transmit packets using a selected one of several RF carrier frequencies including, but not limited to, the unlicensed 2.4 and 5 Gigahertz (GHz) bands. It is contemplated that the 2.4 GHz band be used for the single-carrier mode in accordance with 802.11b. The 2.4 GHz band may also be employed for the mixed carrier mode to provide backwards compatibility with legacy 802.11b devices. It is contemplated that the 5 GHz band be used for the multi-carrier mode in accordance with 802.11a. It is further contemplated that several different bands be used for the multi-carrier mode (i.e., multi-band operation) including the 2.4 and 5 GHz bands as well as any other selected bands whether standard or not. For example, the FCC recently approved a modified version of 802.11a to run in a licensed band near 6 GHz. In this manner, multi-band 802.11 a operation is contemplated.

A second output 217 of the splitter 205 is provided to a mixed carrier pulse shape block or digital filter 219. The digital filter 219 receives a single-carrier preamble and header signal from the kernel 203 and shapes or filters the signal in such as manner to have a similar power spectrum as the multi-carrier signal employed for the mixed carrier waveform. In particular, the digital filter 219 includes finite impulse response (FIR) filter taps that are scaled so that the power spectrum of the single-carrier signal approximates the power spectrum of the multi-carrier signal. In one embodiment, the digital filter 219 uses a time shaping pulse that is specified in continuous time and that is derived using an infinite impulse response of a brick wall approximation. The infinite impulse response is preferably truncated using a continuous-time window that is sufficiently long to achieve desired spectral characteristics (to approximate multi-carrier modulation) but sufficiently short to reduce complexity. The resulting continuous time pulse shape may be sampled at the sample rate of the DAC 215, which is 44 MHz in the embodiment shown. For 802.11g using Barker and OFDM, the FIR taps are scaled such that the Barker preamble and header power spectrum approximates the OFDM power spectrum.

The mixed carrier preamble and header output from the digital filter 219 is provided to one input 221 of a combiner 223, which receives a multi-carrier payload from a multi-carrier processor or kernel 225 at a second input 227. As described further below, the combiner 223 operates to combine the mixed carrier preamble and header with the multi-carrier payload to develop a mixed carrier packet at its output 228, which is coupled to a second input 229 of the MUX 213. The kernel 225 incorporates the core processing functions to configure multi-carrier packets at a selected sample rate, such as the 44 MHz sample rate of the DAC 215. The output of the kernel 225 is provided to the input 227 of the combiner 223 and to a third input 231 of the MUX 213. The transmitter 201 operates in the single-carrier mode (e.g. 802.11b) when the control logic 206 controls the splitter 205 to select its first output 207 and controls the MUX 213 to select its first input 211 so that single-carrier packets generated by the kernel 203 and shaped by the pulse shape block 209 are provided to the DAC 215. The transmitter 201 operates in the mixed signal mode (e.g. 802.11g) when the control logic 206 controls the splitter 205 to select its second output 217 and controls the MUX 213 to select its second input 229 so that mixed carrier packets from combiner 223 are provided to the DAC 215. The transmitter 201 operates in a multi-carrier mode (e.g. 802.11a) when the control logic 206 controls the MUX 213 to select its third input 231 so that multi-carrier packets generated by the kernel 225 are provided to the DAC 215.

It is noted that the kernel 203 may be configured to be capable of producing an entire single-carrier packet (via pulse shaper 209) and that the kernel 225 may be configured to be capable of producing an entire multi-carrier packet. The combiner 223, however, combines the first portion or preamble and header of the single-carrier signal with the payload portion of the multi-carrier signal (e.g., including the preamble 113, the data field 115 and SIFs 117) to generate the mixed carrier packet. The single-carrier kernel 203 is further configured to modify the header 111 of the single-carrier section 103 to include a bit or field that indicates mixed carrier mode of operation. The mixed carrier mode bit informs the receiver that the packet is a mixed carrier signal rather than a single-carrier signal.

Figure 3:
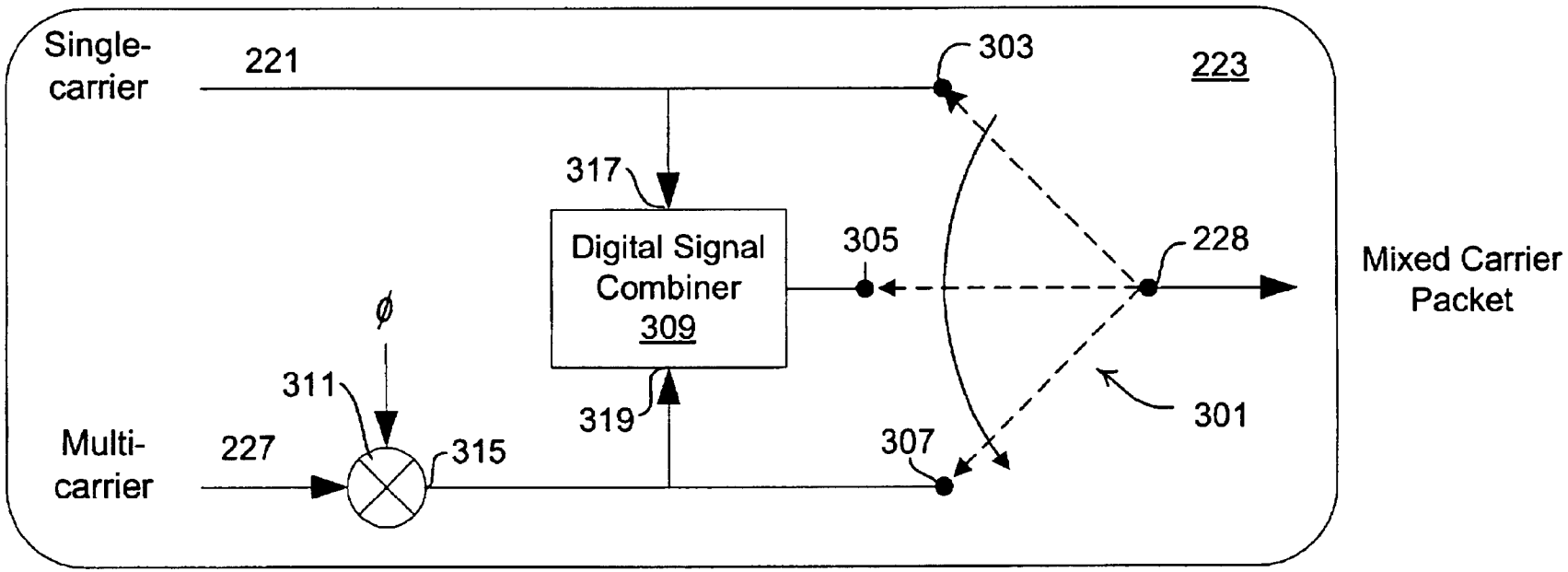
FIG. 3 is a simplified block diagram of an embodiment of the combiner of FIG. 2.

FIG. 3 is a simplified block diagram of an embodiment of the combiner 223. The combiner 223 performs phase and time alignment between the single-carrier header and preamble received via its input 221 and the multi-carrier payload received via its input 227. The combiner 223 also transitions between single-carrier header termination and multi-carrier payload onset. The combiner 223 includes a soft switch 301 that figuratively switches the output 228 between first, second and third terminals 303, 305 and 307, respectively. The soft switch 301 is not necessarily implemented as a physical or mechanical switch, but instead is implemented in firmware or digital logic to perform smooth switching between the signals during transition. The first terminal 303 is coupled to the input 221 of the combiner 223 and to a first input 317 of a digital combiner block 309. The second terminal 305 is coupled to the output of the digital combiner block 309. The third terminal 307 is coupled to an output 315 of a phase rotator 311, which is also provided to a second input 319 of the digital combiner block 309. As described further below, the phase rotator 311 rotates or multiplies the multi-carrier signal by a phase angle "$\phi$" relative to the last portion of the single-carrier signal to maintain phase continuity. The digital combiner 309 combines the single-carrier and multi-carrier signals during the transition between the full single-carrier portion and the full multi-carrier portion of the mixed carrier signal.

Figure 4B:
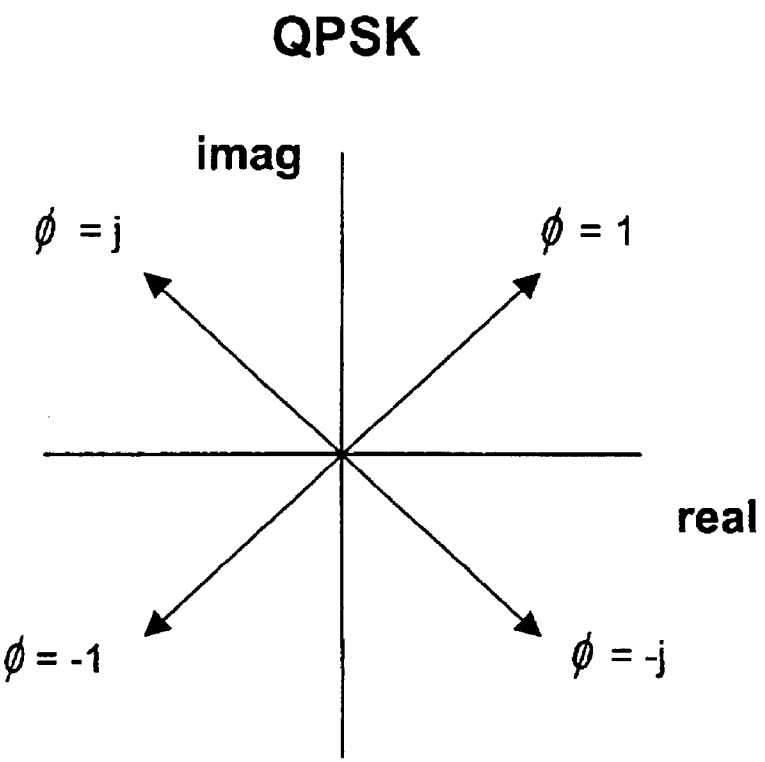
FIGS. 4A and 4B are graph diagrams of phase relationships for an exemplary single-carrier modulation scheme using either BPSK or QPSK, respectively.
Figure 4A:
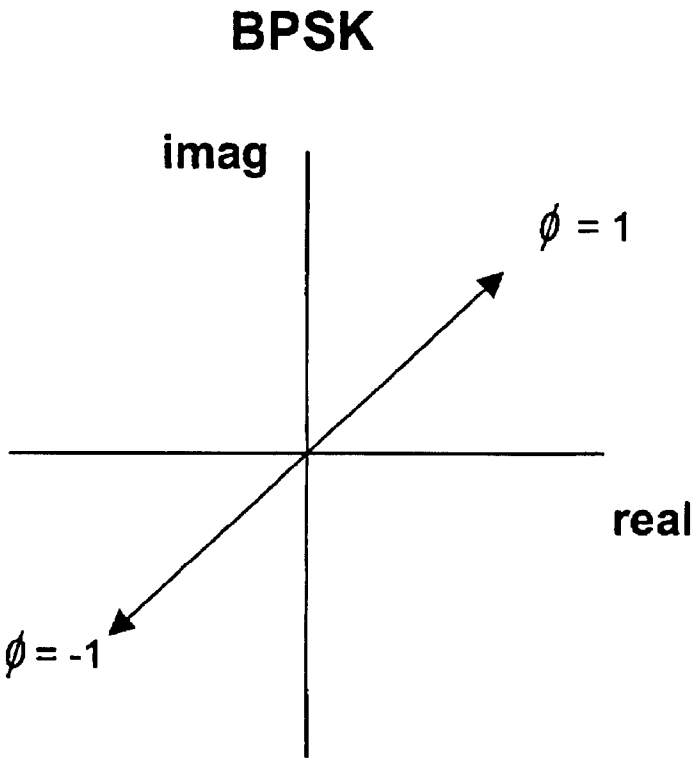

FIGS. 4A and 4B are graph diagrams of phase relationships for an exemplary single-carrier modulation scheme using either BPSK or QPSK, respectively. FIG. 4A is a graph diagram of a BPSK plot illustrating that BPSK incorporates both real and imaginary portions in two quadrants (1 of 2 phases). The phase angle $\phi$ is either 1 or −1. FIG. 4B is a simplified graph diagram of a QPSK plot illustrating that QPSK incorporates both real and imaginary portions in all four quadrants (1 of 4 phases). The phase angle $\phi$ is either 1, j, −1 or −j. The particular phase of a signal is obscured during transmission so that absolute phase is indeterminate. A receiver is typically configured to determine and track the phase of the incoming signal. However, for the mixed carrier signal, the relative phase between the single-carrier and multi-carrier portions should be maintained or otherwise determinable to facilitate acquisition by the receiver. Therefore, the phase of the multi-carrier signal is based on the phase of the last portion of the single-carrier signal to facilitate receiver phase acquisition.

The single-carrier signals, employing Direct Sequence Spread Spectrum (DSSS), are fundamentally different as compared to the OFDM multi-carrier signal format. For CCK-OFDM, either of the BPSK or QPSK formats may be re-used for the header. The phase of the last Barker word of an 802.11b header determines the phase of the coherent OFDM signal relative to an OFDM signal generated by the kernel 225. Referring back to FIG. 3, for CCK-OFDM, the phase rotator 311 rotates the OFDM signal by the phase angle $\phi$ of the last Barker word and asserts the rotated OFDM signal at its output 315. The rotated OFDM signal is applied to the input 319 of the digital combiner 309 and to the third terminal 307 of the soft switch 301. A phase angle of 1 corresponds to 0 degree rotation (no rotation), a phase angle of j corresponds to 90 degree rotation, a phase angle of −1 corresponds to 180 degree rotation and a phase angle of −j corresponds to −90 degree rotation. The multi-carrier signal, such as OFDM, is a complex number including real and imaginary parts, otherwise referred to as in-phase (I) and quadrature phase (Q) components, so that mathematically the I and Q components are multiplied by −1, j or −j.

Figure 5:
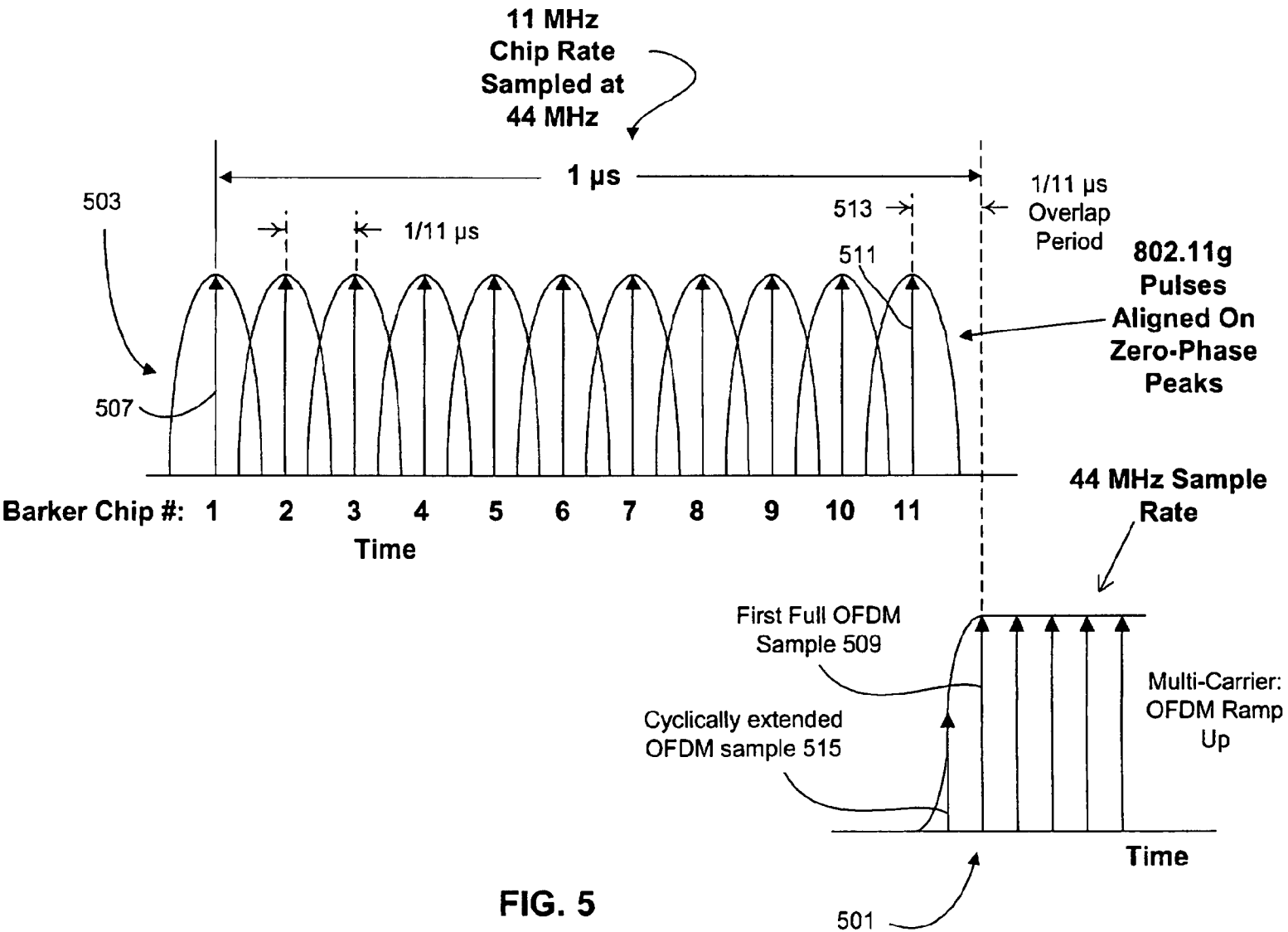
FIG. 5 is a timing diagram illustrating alignment between the single-carrier and multi-carrier portions of the signals using Barker and OFDM.

FIG. 5 is a timing diagram illustrating alignment between the single-carrier and multi-carrier portions of the signals using Barker and OFDM. The timing diagram illustrates alignment of an OFDM signal portion 501 with the last Barker word 503 of the header. The first chip of each Barker word, including the first chip of the last Barker word 503, shown at 507, is centered on the 1 μs alignment, and each subsequent Barker chip of each word is centered every 1/11 μs or 91 nanoseconds (ns). For onset of the OFDM signal, the first full sample of the OFDM signal, shown at 509, occurs 1 μs after the zero-phase peak of first chip of the last Barker word in the header, and thus 1/11 μs after the last chip 511 of the last Barker word thereby maintaining timing during the transition. The period between the last chip 511 and the first full OFDM sample 509 forms a 1/11 μs overlap period 513 between the last Barker word 503 and the first full sample of the OFDM signal. A scaled OFDM sample 515 is shown before the first full scale OFDM sample 509 to demonstrate operation of the digital combiner 317 to smooth the transition between the waveforms. The OFDM sample 515 is cyclically extended in that it occurs early prior to full onset of the OFDM sample. Such transition time alignment allows the equalizer information and the timing information to carry over between the single- and multi-carrier portions of the mixed carrier signal.

Referring back to FIG. 3, the soft switch 301 connects the first terminal 303 to the output 228 of the combiner 223 until just after the last Barker chip 511 in order to forward the last Barker word. Then, after the last Barker chip 511, the switch 301 switches to connect the output of the digital combiner 309 at the second terminal 305 to the output 228. The digital combiner 309 digitally combines the single-carrier signal at input 317 with the rotated multi-carrier signal at input 319 during the overlap period 513. It is noted that a digital combiner is used since the signals are digitally sampled in the configuration shown, although analog combiners or the like are contemplated in alterative embodiments. In one embodiment, the digital combiner 309 ramps down the single-carrier signal while ramping up the multi-carrier signal. Since the single-carrier and multi-carrier signals are both sampled at 44 MHz, and since alignment is based on 11 MHz Barker chip, there are three (3) intermediate samples between the last barker chip 511 and the first full OFDM sample 509 in the overlap period 513. In one embodiment, the digital combiner 309 combines 75% of the Barker signal with 25% of the OFDM signal for the first intermediate sample, combines 50% of the Barker signal with 50% of the OFDM signal for the second intermediate sample, and combines 25% of the Barker signal with 75% of the OFDM signal for the third intermediate sample during the transition, which intermediate samples are provided to the output 228 on consecutive 44 MHz cycles. Before the first full OFDM sample 509, the soft switch 301 switches to connect terminal 307 with the rotated OFDM sample at the output 315 of the phase rotator 311 to the output 228, and remains at the terminal 307 for the remainder of the multi-carrier section 105.

Figure 6:
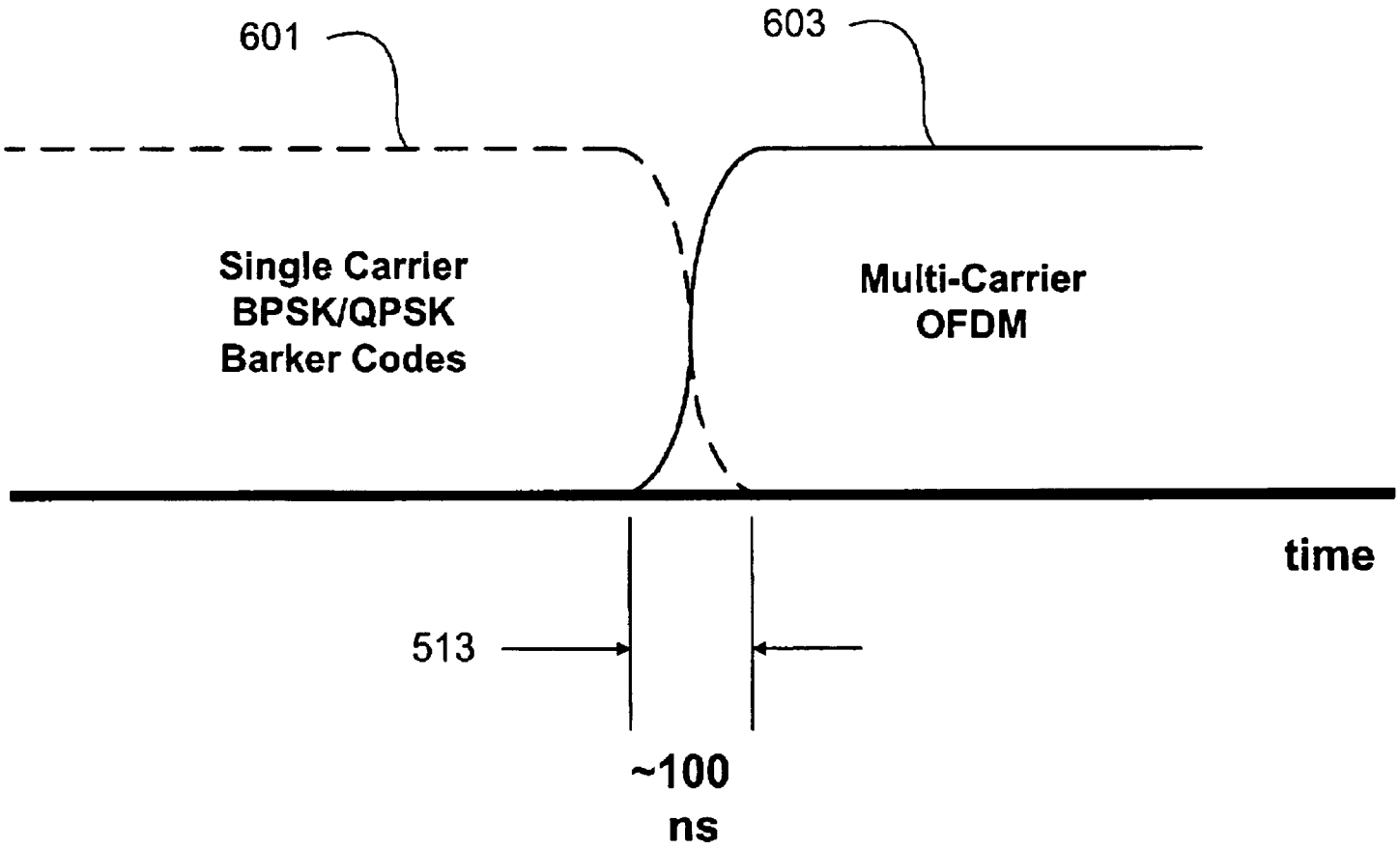
FIG. 6 is a graph diagram illustrating exemplary termination of the single-carrier signal and onset of the multi-carrier signal during an overlap period.

FIG. 6 is a graph diagram illustrating exemplary termination of the single-carrier signal, shown with a dashed curve at 601 and shaped consistent with 802.11b, and onset of an OFDM symbol, shown at 603 and shaped identical to 802.11a, during the overlap period 513. As illustrated in these graph diagrams, the single-carrier is terminated in a controlled fashion when transitioning from single-carrier to multi-carrier. This single-carrier termination maintains the AGC at the point of transition, minimizes the signal power gap, which in turn minimizes the corruption of one signal by the other. The single-carrier termination of the 802.11b segment is similar to that used for 802.11a OFDM shaping. 802.11a specifies a windowing function for OFDM symbols, which is employed to define termination of single-carrier segment. The single-carrier signal is terminated in a predetermined window of time, such as nominally 100 nanoseconds (ns). It is not necessary to completely flush the single-carrier pulse-shaping filter. The resulting distortion to the last Barker word in the header is trivial compared to the 11 chips processing gain, thermal noise and multi-path distortion. The termination may be accomplished either explicitly in the digital signal processing or by analog filtering.

Figure 7:
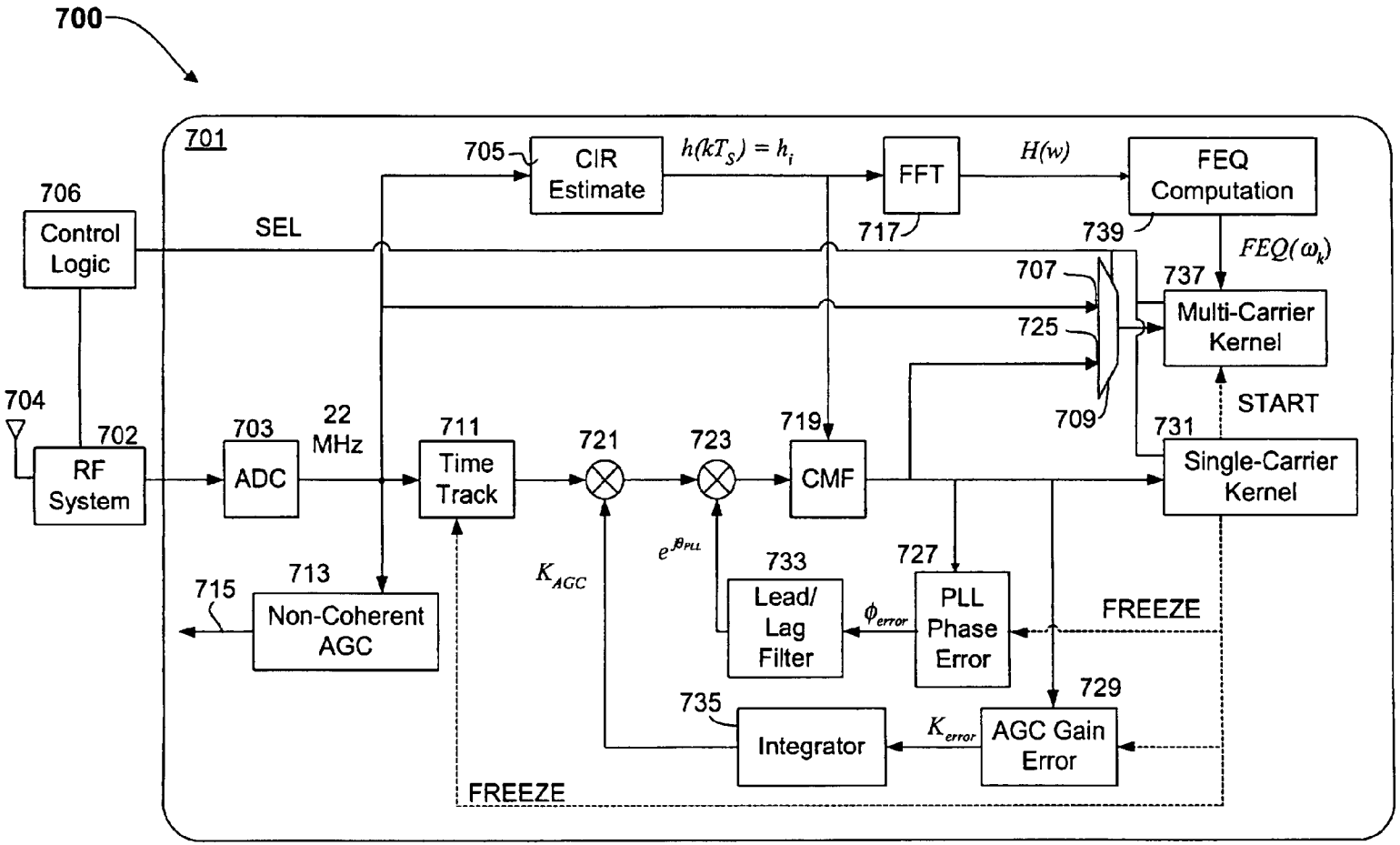
FIG. 7 is a block diagram of a mixed carrier signal receiver including a Baseband receiver implemented according to one embodiment of the present invention.

FIG. 7 is a block diagram of a receiver 700 including a Baseband receiver 701 implemented according to one embodiment of the present invention. The receiver 700 includes an RF system that receives an RF signal from a wireless medium via an antenna 704, and that converts the RF signal to a Baseband signal. The Baseband analog input signal is applied to the input of an analog to digital converter (ADC) 703. The ADC 703 asserts a corresponding digital Baseband signal sampled at a 22 MHz rate to a channel impulse response (CIR) estimate block 705, to a first input 707 of a MUX 709, to an input of a time track loop block 711 and to an input of a non-coherent automatic gain control (AGC) feedback block 713. The receiver 700 converts the RF signal from the wireless channel to the Baseband analog input signal via a series of amplifier, filter and mixer stages as known to those skilled in the art. The gain range of the receiver 700 is typically large in order to detect weak signals (high gain) or reduce strong signals (low gain). The ADC 703 could be implemented with sufficient bit resolution to cover the entire gain range, but is usually only implemented to include only a sufficient number of bits for desired resolution of the incoming Baseband signal. The AGC feedback block 713 is employed to assert a feedback signal on a feedback line 715 to the RF system 702 in an attempt to resolve the gain of the receiver 700 to a target gain range within the range of the ADC 703. The AGC feedback block 713 is "non-coherent" in that it operates without regard to signal timing, frequency, phase or other parameters to roughly resolve gain for the incoming signal. In this manner, the AGC feedback block 713 performs a rough gain adjustment.

In a similar manner as described above for the transmitter 200, the receiver 700 includes control logic 706 that is coupled to the RF system 702 and the Baseband receiver 706 via control and select (SEL) signals for controlling operation and for selecting one of several modes of operation. The receiver 700 may also be configured to operate in single-carrier mode for receiving and acquiring single-carrier packets or signals, multi-carrier mode for acquiring multi-carrier packets and mixed carrier mode for acquiring mixed carrier packets. Further, the receiver 700 may be configured for multi-band operation including the 2.4 and 5 GHz bands and other bands as desired. The 2.4 GHz band is contemplated for the single-carrier and mixed carrier modes for compatibility with 802.11b or 802.11b legacy devices. Any selected band may be employed for multi-carrier modes of operation, and multi-band 802.11a operation is contemplated. It is noted that the RF system 202 and the control logic 206 may be combined with the RF system 702 and the control logic 706, and that the Baseband transmitter 200 and the Baseband receiver 700 may both be coupled to the combined RF system and control for implementing an RF transceiver according to an embodiment of the present invention.

For single-carrier and mixed carrier modes of operation, the CIR estimate block 705 examines the known preamble of the signal, estimates the wireless channel and outputs a time domain signal $h_i$ representing the impulse response of the channel (and intermediate filters). In one embodiment, the CIR estimate block 705 is a FIR filter with a selected number "i" of filter taps. The $h_i$ signal is provided to the inputs of a Fast Fourier Transform (FFT) block 717 and to a channel matched filter (CMF) block 719. The CMF block 719 performs a conjugate and reverse time function of the $h_i$ signal and programs its taps accordingly. The CMF block 719 may also comprise a FIR filter. Distortion of the signal due to channel effects are substantially removed by the CMF block 719. The time track block 711 is a self-contained digital adjust filter that examines and adjusts timing of the digital Baseband signal. For example, the time track block 711 adjusts timing based on Barker chips of an 802.11b signal. The time track block 711 asserts a timing adjusted signal to one input of a multiplier 721, which multiplies a gain adjust signal $K_{AGC}$ received at its other input to generate a gain-adjusted signal. The multiplier 721 asserts the gain adjusted signal to one input of a phase rotator 723, which adjusts the signal using a phase adjust signal $e^{j\theta PLL}$ received at its other input to generate a phase-adjusted signal. The phase rotator 723 asserts the phase-adjusted signal to the input of the CMF block 719, which removes channel distortion from the signal. The output of the CMF block 719 is coupled to a second input 725 of the MUX 709, to the input of a single-carrier kernel 731, to the input of a phase-locked loop (PLL) phase error block 727 and to the input of an AGC gain error block 729. The SEL signals between the control logic 706 and the single-carrier kernel 731 are provided for controlling the mode of operation. Although the control logic 706 generally controls operation, the single-carrier kernel 731 may change the mode of operation from single-carrier to mixed carrier mode upon detecting a mixed carrier packet.

The PLL phase error block 727 detects any phase errors at the output of the CMF block 719 and asserts a corresponding phase error signal $\phi_{error}$ to a lead/lag filter 733, which generates and asserts the phase adjust signal $e^{j\theta PLL}$ to the phase rotator 723. The AGC gain error block 729 compares the gain of the signal at the output of the CMF block 719 with a predetermined target gain and generates a corresponding gain error signal $K_{error}$ to an integrator block 735. The integrator block 735 receives the gain error signal $K_{error}$, generates the gain adjust signal $K_{AGC}$, and provides the gain adjust signal $K_{AGC}$ to the multiplier 721. In this manner, at least three different loops are provided in the Baseband receiver 701 for the single-carrier signals, including a timing loop centered at the time track loop 711 to adjust timing, a gain loop centered at the multiplier 721 to adjust gain, and a phase loop centered at the phase rotator 723 to adjust frequency and phase. These loops are initially held constant at nominal values until the taps of the CMF block 719 are programmed using the $h_1$ signals from the CIR estimate block 705. After the CMF block 719 is programmed, the loops are released to resolve and reduce or eliminate timing, gain, phase and frequency errors in the incoming signal.

The MUX 709 is controlled by the SEL signals to select its first input 707 for the multi-carrier modes of operation, such as 802.11a-based packets. The output of the MUX 709 is coupled to an input of a multi-carrier kernel 737, which, as described further below, incorporates the necessary processing functions to resolve the timing, frequency, gain, phase, and channel response of multi-carrier signals received via the ADC 703. The SEL signals from the control logic 706 are provided to the multi-carrier kernel 737 for controlling the mode of operation. The remaining portions of the Baseband receiver 701 are bypassed for multi-carrier mode of operation. For single-carrier mode of operation, the kernel 731 incorporates the necessary processing functions to detect and resolve single-carrier packets. The frequency, timing, phase, gain and filter response are all handled by the loops and CMF block 719 for resolving the Barker or CCK single-carrier signal.

The single-carrier kernel 731 is used for resolving the single-carrier section 103 and the multi-carrier kernel 737 is used for resolving the multi-carrier section 105 of a mixed carrier packet 101 for mixed carrier mode of operation. The MUX 709 is controlled by the SEL signals to select its second input 725 for providing the output of the CMF block 719 to the kernel 737. For mixed carrier mode of operation, however, the kernel 737 does not attempt to resolve the single-carrier section 103 and is effectively disabled until issuance of a START control signal from the kernel 731. The kernel 731 resolves the single-carrier section 103 of the incoming signal as though it were a normal single-carrier packet. The kernel 731 detects the mixed mode bit in the header 111 of the single-carrier section 103 and initiates mixed carrier mode of operation. If a mixed carrier packet is indicated by the mode bit, the kernel 731 issues a FREEZE control signal at the end of the single-carrier section 103 to the PLL phase error block 727, the AGC gain error block 729 and the time track block 711. Assertion of the FREEZE signal causes the PLL phase error block 727 to set the phase error signal $\phi_{error}$ to zero thereby holding the current level of the phase adjust signal $e^{j\theta PLL}$. Assertion of the FREEZE signal causes the AGC gain error block 729 to set the gain error signal $K_{error}$ or to zero thereby holding the current level of the gain adjust signal $K_{AGC}$. Assertion of the FREEZE signal stops operation of the time track block 711 to disable time tracking adjustments. Freezing these parameters preserves the phase, frequency, gain, and sample timing from the single-carrier waveform to be used as the starting point for the multi-carrier waveform.

The kernel 731 asserts the START signal to initiate operation of the kernel 737 at the beginning of the multi-carrier payload. The kernel 737 has its own gain, phase/frequency and time tracking loops as further described below. The FFT block 717 converts the time impulse response signal $h_i$ to a corresponding frequency domain signal $H(\omega)$ during the single-carrier section 103 portion of the mixed signal. The $H(\omega)$ signal is the frequency response of the wireless channel and is provided to the input of a frequency domain equalizer (FEQ) computation block 739. The FEQ computation block 739 calculates frequency domain equalizer taps according to the following equation 1:

$$FEQ(\omega_k) = \frac{1}{|H(\omega_k)|^2} \tag{1}$$

where the subscript "k" is an index denoting the "tones" or "sub-carriers" associated with the multi-carrier signal. For OFDM, $\omega_k$ denotes the sub-carrier frequencies of interest for the OFDM signal. The FEQ operates as a one tap frequency domain equalizer for each of the sub-carriers of the OFDM signal, which removes gain and phase distortion due to the wireless channel. Since the Baseband receiver 701 preserves the CIR estimate from the single-carrier waveform to the multi-carrier waveform, the single-carrier preamble is used as the FEQ for the kernel 737. In this manner, signal coherency is maintained during the transition from single-carrier to multi-carrier portions of the mixed signal.

Figure 8:
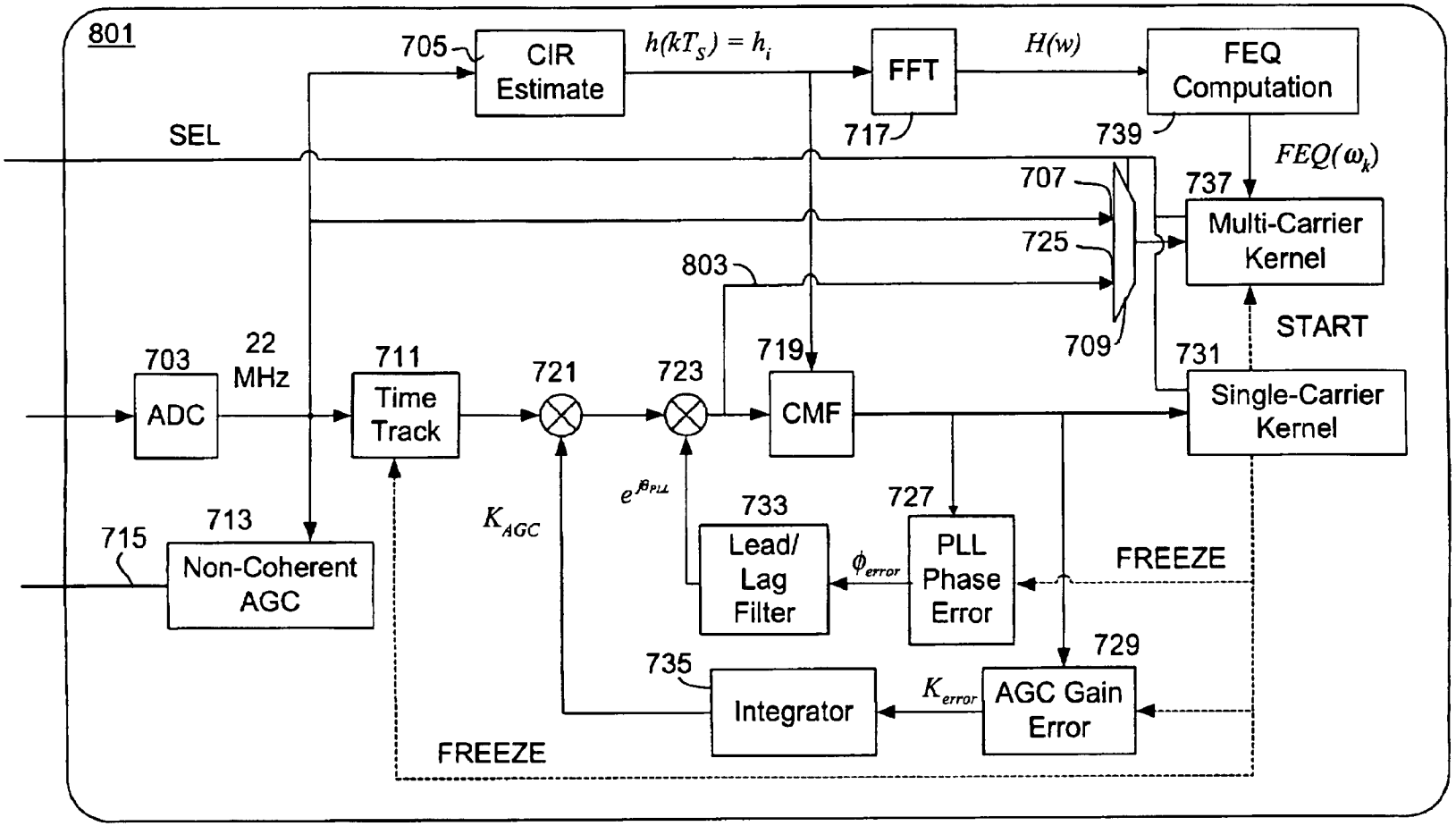
FIG. 8 is a block diagram of a Baseband receiver implemented according to an alternative embodiment of the present invention and similar to the Baseband receiver of FIG. 7.

FIG. 8 is a block diagram of a Baseband receiver 801 implemented according to an alternative embodiment of the present invention. The remaining portions of the receiver, such as the RF system 702 and the control logic 706 are not shown but would operate in a similar manner. The Baseband receiver 801 is similar to and could replace the Baseband receiver 701, except that the output of the phase rotator 723 is coupled to the second input 725 of the MUX 709 rather than the output of the CMF block 719. Operation is substantially similar, except that the FREEZE and START signals are asserted before the end of the single-carrier section 103 to account for latency through the CMF block 719. Also, the FEQ computation block 739 calculates frequency domain equalizer taps according to the following equation 2:

$$FEQ(\omega_k) = \frac{1}{H(\omega_k)} \tag{2}$$

The equation for calculating FEQ for the Baseband receiver 801 is somewhat simpler from a computation point of view than for the Baseband receiver 701. However, the Baseband receiver 701 does not need to determine the latency through the CMF block 719 for determining when to assert the FREEZE and START signals.

Figure 9:
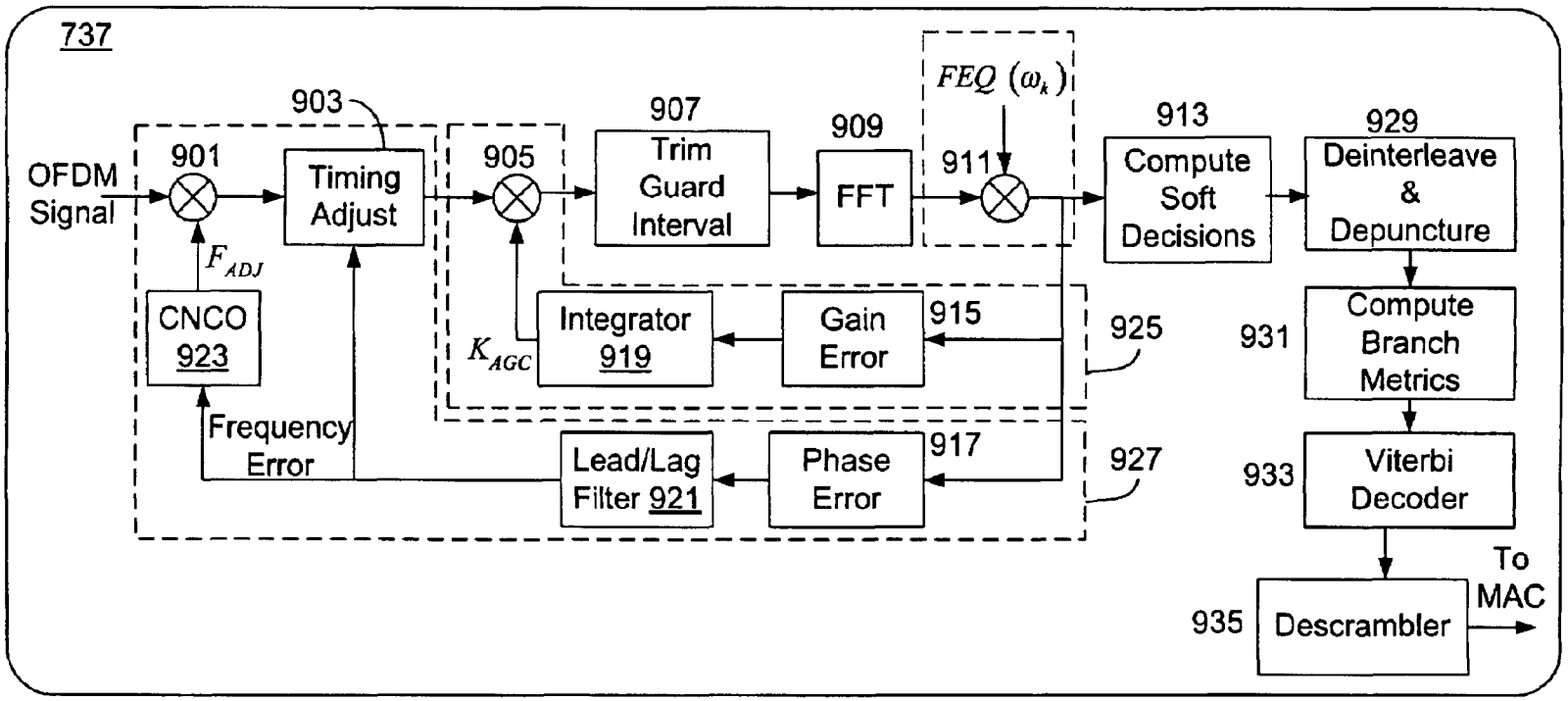
FIG. 9 is a block diagram of an exemplary OFDM embodiment of the kernel of FIGS. 7 and 8.

FIG. 9 is a block diagram of an exemplary OFDM embodiment of the kernel 737. It is appreciated that other multi-carrier kernels are contemplated depending upon the particular multi-carrier modulation scheme employed. An OFDM signal from the output of the MUX 709 is provided to a combiner 901, which combines a frequency adjust signal $F_{ADJ}$ and provides a frequency adjusted signal to a timing adjust block 903. The timing adjust block 903 receives a Frequency Error signal at another input and provides a timing adjusted signal to one input of a multiplier 905. The multiplier 905 multiplies the output of the timing adjust block 903 with a gain adjust signal $K_{AGC}$ and asserts a gain adjusted signal to the input of a trim guard interval block 907. The trim guard interval block 907 operates to mitigate inter-symbol interference (ISI) and provides its time domain output signal to an FFT block 909, which converts the time domain signal to a frequency response signal. The frequency response signal is provided to one input of a combiner 911, which receives the frequency domain equalizer taps $FEQ(\omega_k)$ from the FEQ computation block 739 previously described.

The combiner 911 asserts a channel adjusted signal to the input of a soft decision block 913, to the input of a gain error block 915 and to the input of a phase error block 917. The gain error block 915 provides a gain error signal to an integrator 919, which asserts the gain adjust signal $K_{AGC}$ signal to the multiplier 905. The phase error block 917 asserts a phase error signal to a lead/lag filter block 921, which asserts the Frequency Error signal to the timing adjust block 903 and to an input of a complex numerically-controlled oscillator (CNCO) circuit 923. The CNCO 923 generates the frequency adjust signal $F_{ADJ}$ provided to the combiner 901. The CNCO circuit 923 adjusts the frequency and phase for all sub-carriers of the OFDM signal.

The gain error block 915, the integrator 919 and the multiplier 905 form a gain tracking loop 925 of the OFDM-based kernel 737 that adjusts the gain of the OFDM signal. The phase error block 917, the lead/lag filter 921, the CNCO circuit 923, the combiner 901 and the timing adjust block 903 form a frequency, phase and timing tracking loop 927 that adjusts frequency, phase and timing of the OFDM signal. When the START signal is asserted, the kernel 737 begins processing the multi-carrier portion of the mixed carrier signal from the point at which the single-carrier loops were suspended by the FREEZE signal. In this manner, even though the OFDM kernel 737 includes its own multi-carrier gain, frequency, phase and time tracking loops, these multi-carrier loops track relative to the gain, frequency, phase and time parameters determined by the single-carrier loops for single-carrier section 103. Since the transmitter maintained coherency across the single-carrier to multi-carrier section of the mixed carrier signal, coherency is also maintained between the single-carrier and multi-carrier processor portions of the Baseband receiver. Furthermore, the CIR estimate obtained during the single-carrier section 103 by the CIR estimate block 705 is applicable to the multi-carrier section 103 of the mixed carrier signal 101 because of the power spectrum approximation performed by the mixed carrier digital filter 219 of the transmitter 201. In this manner, the frequency domain equalizer taps $FEQ(\omega_k)$ from the FEQ computation block 739 are relevant to the multi-carrier section 105 to remove gain and phase distortions of the wireless channel. In this manner, a coherent transition occurs between the single-carrier and multi-carrier sections of the mixed signal packet 101 in the Baseband receiver 701 or 801.

The OFDM kernel 737 may be implemented in standard fashion to include a deinterleave and depuncture block 929, a compute branch metrics block 931, a Viterbi Decoder 933, and a descrambler 935, which outputs retrieved signal information to a local media access control (MAC) device.

Figure 10:
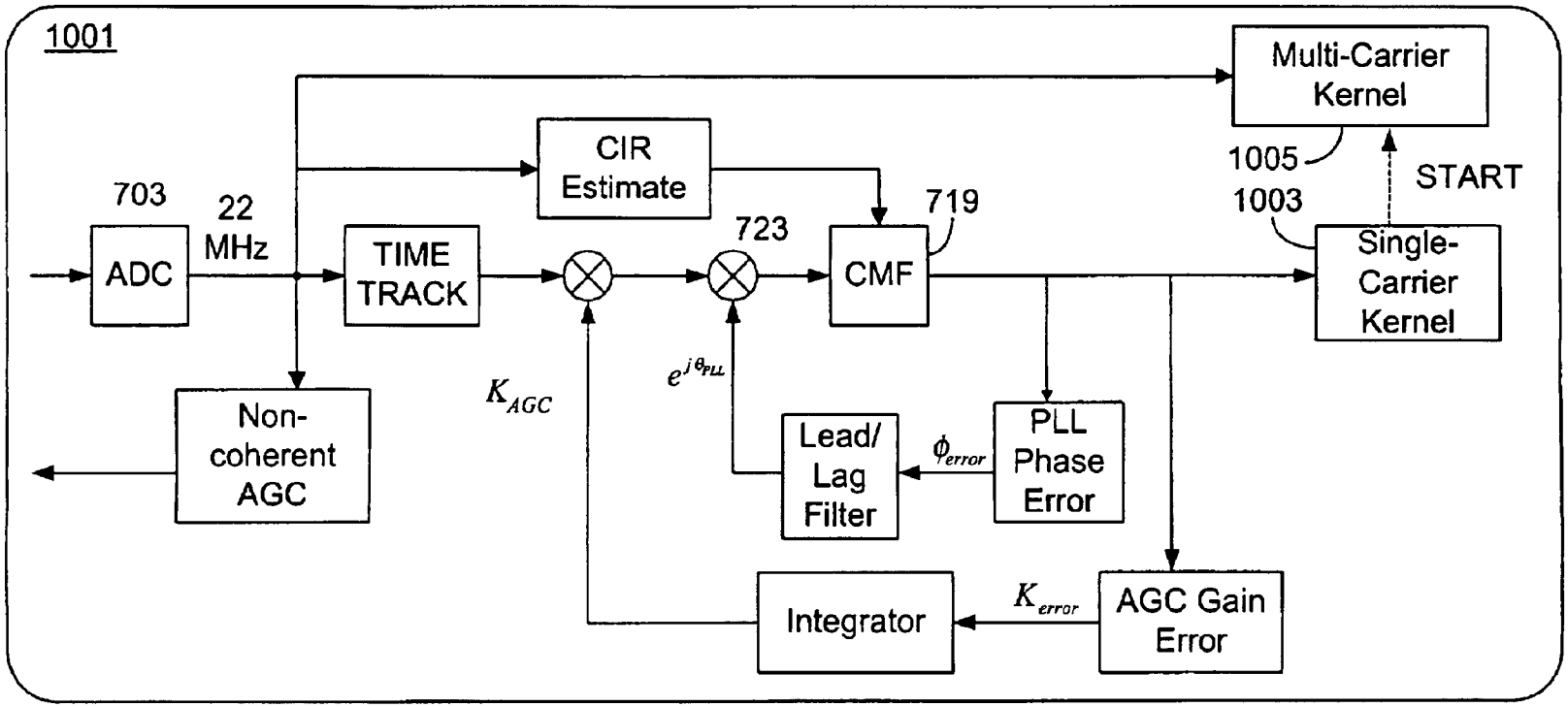
FIG. 10 is a block diagram of a Baseband receiver implemented according to an alternative and non-coherent embodiment of the present invention.

FIG. 10 is a block diagram of a Baseband receiver 1001 implemented according to an alternative and non-coherent embodiment of the present invention. The single-carrier portion of the Baseband receiver 1001 operates in substantially identical manner as the Baseband receivers 701 and 801 and is not further described. The Baseband receiver 1001 includes a single-carrier kernel 1003 which operates similar to the kernel 731, except that it does not assert the FREEZE control signal. Instead, when a mixed carrier packet 101 is detected, the kernel 1003 issues the START signal to an multi-carrier kernel 1005. The kernel 1005 operates in a similar manner as the kernel 737 previously described, except that it receives its input directly from the ADC 703 rather than the CMF block 719 or the phase rotator 723. In this manner, the kernel 1005 must reacquire frequency, phase, gain, sample timing and the CIR estimate directly from the multi-carrier section 105, such as from the 8 μs OFDM Long Sync 119 of the OFDM preamble 113 portion of the mixed carrier packet 101.

In other embodiments, the Baseband receiver 1001 employs any selected combination of gain, phase, frequency or timing parameters determined by the gain, phase and timing loops of the single-carrier portion of the receiver as starting points for the multi-carrier loops. For example, a timing parameter determined by the time track block 711 may be programmed into the timing adjust block 903 of the kernel 737 and/or a frequency parameter determined by the lead/lag filter 733 may be programmed within the lead/lag filter 921 to facilitate multi-carrier acquisition by the kernel 737. Although gain and phase parameters from the single-carrier loops may also be used in the multi-carrier kernel, such information is already determined from the preamble portion (e.g., OFDM Long Sync 119) of the multi-carrier section 105 of the mixed signal packet 101 while determining a CIR estimate.

The non-coherent embodiments are also backwards compatible with single-carrier 802.11b mode radios and are capable of operating with the proposed 802.11g mixed carrier waveform described herein. The non-coherent embodiments, however, are not as robust as the coherent embodiments since they do not use as much of the information derived during the single-carrier portion of the signal and instead rely on the relative short Long Sync portion of the OFDM signal. The non-coherent embodiments, therefore, have somewhat decreased sensitivity and a greater packet error rate as compared to the coherent embodiments. Nonetheless, the non-coherent embodiments provide acceptable performance using a simpler and less expensive design.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

The invention claimed is:

1. A baseband receiver, comprising:

a channel impulse response (CIR) estimate block that is capable of generating an impulse response signal based on a receive signal that is a single-carrier signal or a single-carrier segment of a mixed carrier signal in which the single-carrier segment has a spectrum that approximates a multi-carrier spectrum;

gain, phase and timing loops that adjust gain, phase, frequency and timing of the receive signal to provide an adjusted receive signal;

a channel matched filter (CMF), coupled to the CIR estimate block, that filters the adjusted receive signal according to the impulse response signal;

a single-carrier processor that processes the adjusted and filtered receive signal to resolve the single-carrier segment of the mixed carrier signal, the single-carrier processor capable of detecting a mixed carrier mode indication in the single-carrier segment and asserting a start indication corresponding to the end of the single-carrier segment; and a multi-carrier processor capable of processing a multi-carrier segment of the mixed carrier signal in response to assertion of the start indication.

2. The baseband receiver of claim 1, wherein a modulation scheme selected from the group consisting of Binary Phase Shift Keying (BPSK) and Quadrature Phase Shift Keying (QPSK) is used for modulation of the single-carrier segment and wherein orthogonal frequency division multiplexing (OFDM) is used for modulation of the multi-carrier segment of the mixed carrier signal.

3. The baseband receiver of claim 1, further comprising:

control logic, coupled to the single-carrier processor and the multi-carrier processor, that selects between single-carrier, multi-carrier and mixed carrier modes of operation;

the single-carrier processor configured to process the adjusted and filtered receive signal of the single-carrier signal in the single-carrier mode of operation and to process the single carrier segment of the adjusted and filtered receive signal of the mixed carrier signal in the mixed carrier mode of operation; and the multi-carrier processor configured to process a multi-carrier receive signal prior to adjustment and filtering in the multi-carrier mode of operation and to process the multi-carrier segment of the mixed carrier signal in the mixed carrier mode of operation.

4. The baseband receiver of claim 3, wherein the multi-carrier processor operates in a non-coherent mixed carrier mode in which the multi-carrier processor processes the multi-carrier segment of the receive signal prior to the adjustment and filtering.

5. The baseband receiver of claim 4, wherein the multi-carrier segment includes a synchronization field; and the multi-carrier processor determines frequency domain equalizer taps from the synchronization field.

6. The baseband receiver of claim 5, wherein the gain, phase and timing loops develop gain, phase, frequency and timing adjust parameters; and the multi-carrier processor is configured to be programmable with a selected combination of the gain, phase, frequency and timing adjust parameters.

7. The baseband receiver of claim 6, wherein the multi-carrier processor includes a phase locked loop with a filter that is configured to be programmable with the frequency adjust parameter; and the multi-carrier processor includes a timing loop that is configured to be programmable with the timing adjust parameter.

8. The baseband receiver of claim 1, wherein the single carrier processor further asserts a freeze indication to the gain, phase and timing loops in response to detecting the mixed carrier mode indication, the freeze indication suspending operation of the gain, phase and timing loops at the end of the single-carrier segment of the mixed carrier signal;

a Fast Fourier Transform (FFT) generator that converts the impulse response signal into a frequency response signal that is provided to a frequency domain equalizer, wherein the frequency domain equalizer is coupled to the FFT generator and determines multi-carrier equalization signals based on the frequency response signal; and the multi-carrier processor, in response to assertion of the start indication, processing multi-carrier segments of adjusted and filtered receive signals using the multi-carrier equalization signals.

9. The baseband receiver of claim 8, wherein the multi-carrier processor is coupled to an output of the CMF; and the frequency domain equalizer determines the multi-carrier equalization signals $FEQ(w_k)$ based on the frequency response signal $H(w_k)$ according to equation $$FEQ(\omega_k) = \frac{1}{|H(\omega_k)|^2}.$$

10. The baseband receiver of claim 8, wherein the multi-carrier processor is coupled to an input of the CMF;

the single-carrier processor asserts the start indication before the end of the single-carrier segment by a CMF latency period; and the frequency domain equalizer determines the multi-carrier equalization signals $FEQ(w_k)$ based on the frequency response signal $H(w_k)$ according to equation $$FEQ(\omega_k) = \frac{1}{H(\omega_k)}.$$

11. The baseband receiver of claim 8, wherein the phase loop comprises:

a phase error detector, coupled to an output of the CMF, that generates a phase error signal;

a phase filter, coupled to the phase error detector, that receives the phase error signal and that generates a phase correction signal; and a phase rotator, coupled in the signal path of the receive signal, that adjusts the receive signal based on the phase correction signal;

wherein the phase correction signal is held constant upon assertion of the freeze indication.

12. The baseband receiver of claim 11, wherein the phase error detector sets the phase error signal to zero upon assertion of the freeze indication to hold the phase correction signal constant.

13. The baseband receiver of claim 8, wherein the gain loop comprises:

a gain error detector, coupled to an output of the CMF, that generates a gain error signal;

an integrator, coupled to the gain error detector, that receives the gain error signal and that generates a gain correction signal; and a multiplier, coupled in the signal path of the receive signal, that adjusts the receive signal based on the gain correction signal;

wherein the gain correction signal is held constant upon assertion of the freeze indication.

14. The baseband receiver of claim 13, wherein the gain error detector sets the gain error signal to zero upon assertion of the freeze indication to hold the gain correction signal constant.

15. The baseband receiver of claim 8, wherein the timing loop comprises a time track block that receives and adjusts timing of the receive signal, and wherein the time track block suspends tracking adjustments of the receive signal upon assertion of the freeze indication.

16. The baseband receiver of claim 8, wherein the multi-carrier processor includes a combiner that combines the multi-carrier equalization signals from the frequency domain equalizer with the frequency response signal based on a received multi-carrier signal.

17. The baseband receiver of claim 8, further comprising:

control logic, coupled to the single-carrier processor and the multi-carrier processor, that selects between single-carrier, multi-carrier and mixed carrier modes of operation;

the single-carrier processor configured to process the adjusted and filtered receive signal of the single-carrier signal in the single-carrier mode of operation and to process the single-carrier segment of the adjusted and filtered receive signal of the mixed carrier signal in the mixed carrier mode of operation; and the multi-carrier processor configured to process the multi-carrier receive signal prior to adjustment and filtering in the multi-carrier mode of operation and to process the multi-carrier segment of the adjusted and filtered receive signal of the mixed carrier signal in the mixed carrier mode of operation.

18. A wireless radio frequency (RF) communication device, comprising:

an RF system that converts RF signals from an antenna to baseband signals and that converts the baseband signals to RF signals for transmission via the antenna;

a baseband transmitter, coupled to the RF system, that is configured to transmit a mixed carrier signal via the RF system by modulating a single-carrier section using a single-carrier modulation and by modulating a multi-carrier section using a multi-carrier modulation, the baseband transmitter filtering the single-carrier section to approximate a multi-carrier power spectrum and formulating the mixed carrier signal to maintain frequency, phase, gain and timing coherency between the single-carrier and multi-carrier sections; and a baseband receiver, coupled to the RF system, comprising:

a channel impulse response (CIR) estimate block that is capable of generating an impulse response signal based on a receive baseband signal from a RF transceiver, the receive baseband signal comprising either a single-carrier signal or a single-carrier segment of a mixed carrier signal in which the single-carrier segment has a power spectrum that approximates the multi-carrier power spectrum;

gain, phase and timing loops that adjust gain, phase, frequency and timing of the receive baseband signal and that provide an adjusted receive signal;

a channel matched filter (CMF), coupled to the CIR estimate block, that filters the adjusted receive signal according to the impulse response signal;

a single-carrier processor, coupled to the CMF that processes the adjusted and filtered receive signal to resolve the single-carrier section of the mixed carrier signal, the single-carrier processor capable of detecting a mixed carrier mode indication in the single-carrier section and asserting a start signal corresponding to the end of the single-carrier section; and a multi-carrier processor that processes the multi-carrier section of the mixed carrier signal in response to assertion of the start signal.

19. The wireless RF communication device of claim 18, wherein a modulation scheme selected from the group consisting of Binary Phase Shift Keying (BPSK) and Quadrature Phase Shift Keying (QPSK) is used for modulation of the single-carrier segment and wherein orthogonal frequency division multiplexing (OFDM) is used for modulation of the multi-carrier segment of the mixed carrier signal.

20. The wireless RF communication device of claim 18, wherein the baseband receiver includes a single-carrier operating mode in which the single-carrier processor processes adjusted and filtered receive signals to resolve single-carrier receive baseband signals, and a multi-carrier operating mode in which the multicarrier processor processes multi-carrier receive baseband signals.

21. The wireless RF communication device of claim 18, wherein the single-carrier receive processor asserts a freeze signal in response to detecting the mixed carrier mode indication, the freeze signal suspending operation of the gain, phase and timing loops;

a Fast Fourier Transform (FFT) block that converts the impulse response signal into a frequency response signal;

a frequency domain equalizer that generates multi-carrier equalization signals based on the frequency response signal; and the multi-carrier processor, in response to the start signal, processing the multicarrier section of the adjusted and filtered receive signal through the suspended gain, phase and timing loops and the CMF and using the multi-carrier equalization signals.

22. The wireless RF communication device of claim 21, wherein the baseband receiver further comprises:

control logic, coupled to the single-carrier processor and the multi-carrier processor, that selects between single-carrier, multi-carrier and mixed carrier modes of operation;

the single-carrier processor configured to process the adjusted and filtered receive signal of the single-carrier signal in the single-carrier mode of operation and to process the single-carrier segment of the adjusted and filtered receive signal of the mixed carrier signal in the mixed carrier mode of operation; and the multi-carrier processor configured to process the multi-carrier receive signal prior to adjustment and filtering in the multi-carrier mode of operation and to process the multi-carrier segment of the adjusted and filtered receive signal of the mixed carrier signal in the mixed carrier mode of operation.

23. The wireless RF communication device of claim 22, wherein the RF transceiver is capable of multi-band operation, wherein the RF system operates in a first RF frequency band for the single-carrier and mixed carrier modes, and wherein the RF system operates in a selected one of multiple frequency bands including the first RF frequency band and a second RF frequency band for the multi-carrier mode.

24. The wireless RF communication device of claim 23, wherein the first RF frequency band is approximately 2.4 gigahertz (GHz) and wherein the second RF frequency band is approximately 5 GHz.

25. The wireless RF communication device of claim 18, wherein the baseband transmitter comprises:

a single-carrier transmit processor that generates a single-carrier signal;

a multi-carrier transmit processor that generates a multi-carrier signal;

a digital filter, coupled to the single-carrier transmit processor, that filters the single-carrier signal to have a power spectrum that approximates a multi-carrier power spectrum; and a signal combiner, coupled to the digital filter and the multi-carrier transmit processor, that combines the filtered single-carrier signal with the multi-carrier signal while maintaining phase, gain and timing alignment.

26. The wireless RF communication device of claim 25, wherein the signal combiner comprises:

a phase multiplier that multiplies the multi-carrier signal by a phase of a last portion of the single-carrier signal and that provides a rotated multi-carrier signal;

a digital combiner that combines the filtered single-carrier signal and the rotated multi-carrier signal and provides a combined mixed carrier signal; and a soft switch that selects the filtered single-carrier signal until reception of the filtered single-carrier signal is completed, that selects the combined mixed carrier signal during a transition period, and that selects the rotated multi-carrier signal at the end of the transition period.

27. The wireless RF communication device of claim 26, wherein the single-carrier signal includes consecutive chips according to a predetermined timing interval and wherein the transition period has a duration equivalent to the predetermined timing interval.

28. A method of generating a mixed carrier packet for radio frequency (RF) transmission, comprising:

generating, *by a multi-carrier processor,* a multi-carrier payload using a selected multi-carrier modulation scheme;

generating a single-carrier segment including a preamble and header using a single-carrier modulation scheme;

filtering the single-carrier segment to have a power spectrum that approximates a power spectrum of the selected multi-carrier modulation scheme; and combining the filtered single-carrier segment with the multi-carrier payload in such a manner to maintain gain, phase, frequency and timing across a transition to provide the mixed carrier packet, wherein said combining includes rotating the multi-carrier payload by a phase determined from the filtered single-carrier segment, the single-carrier modulation scheme comprising Barker modulation and the multi-carrier modulation scheme comprising orthogonal frequency division multiplexing (OFDM) modulation, wherein said rotating comprises rotating an OFDM modulated multi-carrier payload by a phase of a last Barker Word of the filtered single-carrier segment.

29. The method of claim 28, wherein the multi-carrier payload includes an OFDM preamble.

30. The method of claim 28, wherein said combining comprises ramping the filtered single-carrier segment down while ramping the multi-carrier payload up during the transition.

31. The method of claim 30, *wherein* the filtered single-carrier segment [having] *has* a predetermined chip rate, *and the method* further [comprising] *comprises*:

sampling the filtered single-carrier segment and the multi-carrier payload by a predetermined sampling rate; and said combining comprising asserting a first full sample of the multi-carrier payload after a last full sample of the filtered single-carrier segment by a transition time period based on the predetermined chip rate of the filtered single-carrier segment.

32. A method of generating a mixed carrier packet for radio frequency (RF) transmission, comprising:

generating, *by a multi-carrier processor,* a multi-carrier payload using a selected multi-carrier modulation scheme;

generating a single-carrier segment including a preamble and header using a single-carrier modulation scheme;

filtering the single-carrier segment to have a power spectrum that approximates a power spectrum of the selected multi-carrier modulation scheme; and combining the filtered single-carrier segment with the multi-carrier payload in such a manner to maintain gain, phase, frequency and timing across a transition to provide the mixed carrier packet, wherein said combining includes rotating the multi-carrier payload by a phase determined from the filtered single-carrier segment, wherein said combining comprises ramping the filtered single-carrier segment down while ramping the multi-carrier payload up during the transition, the filtered single-carrier segment having a predetermined chip rate, further comprising:

sampling the filtered single-carrier segment and the multi-carrier payload by a predetermined sampling rate; and said combining comprising asserting a first full sample of the multi-carrier payload after a last full sample of the filtered single-carrier segment by a transition time period based on the predetermined chip rate of the filtered single-carrier segment, wherein said combining further comprises combining proportions of each of the filtered single-carrier segment and the multi-carrier payload to provide a plurality of samples during the transition time period.

33. The method of claim 32, wherein the predetermined sampling rate is four times the predetermined chip rate, and wherein said combining proportions during the transition time period comprises providing a first, second and third intermediate samples with the filtered single-carrier segment to the multi-carrier payload percentages of 75/25, 50/50 and 25/75, respectively.

34. A method of acquiring a mixed carrier signal having a single-carrier segment followed by a multi-carrier segment, comprising:

determining gain, phase, frequency and timing adjust parameters of a received baseband signal;

adjusting the received baseband signal using the adjust parameters to provide an adjusted baseband signal;

determining a channel impulse response (CIR) estimate while receiving the single-carrier segment of the received baseband signal;

filtering the adjusted baseband signal based on the CIR estimate to provide a filtered and adjusted baseband signal;

processing the filtered and adjusted baseband signal using a single-carrier processor to acquire the single-carrier segment;

detecting a mixed mode carrier identifier in the single-carrier segment and asserting a mixed mode indication; and in response to the mixed mode indication, processing the received baseband signal using a multi-carrier processor to acquire the multi-carrier segment.

35. The method of claim 34, wherein processing the received baseband signal using the multi-carrier processor comprises processing the received baseband signal prior to the steps of adjusting and filtering.

36. The method of claim 35, further comprising:

determining, by the multi-carrier processor, a channel frequency response estimate from a preamble section of the multi-carrier segment; and filtering the multi-carrier segment based on the determined channel frequency response estimate.

37. The method of claim 36, further comprising using, by the multi-carrier processor, any selected combination of the gain, phase, frequency and timing adjust parameters as at least one starting parameter for acquiring the multi-carrier segment.

38. A method of acquiring a mixed carrier signal having a single-carrier segment followed by a multi-carrier segment, comprising:

determining gain, phase, frequency and timing adjust parameters of a received baseband signal;

adjusting the received baseband signal using the adjust parameters to provide an adjusted baseband signal;

determining a channel impulse response (CIR) estimate while receiving the single-carrier segment of the received baseband signal;

converting the CIR estimate to a frequency response signal;

programming a frequency domain equalizer using the frequency response signal;

filtering the adjusted baseband signal based on the CIR estimate to provide a filtered and adjusted baseband signal;

processing the filtered and adjusted baseband signal using a single-carrier processor to acquire the single-carrier segment;

detecting a mixed carrier mode identifier of the single-carrier segment and asserting a mixed mode indication and a freeze indication;

in response to the freeze indication, holding the gain, phase, frequency and timing adjust parameters constant; and in response to the mixed mode indication, processing the filtered and adjusted baseband signal with a multi-carrier processor that employs the frequency domain equalizer to acquire the multi-carrier segment.

39. The method of claim 38, wherein the determining the gain, phase, frequency and timing adjust parameters includes determining gain, phase, frequency and timing error values; and holding the gain, phase, frequency and timing adjust parameters constant comprises setting the gain, phase, frequency and timing error values to zero.

*40. A baseband receiver, comprising:*

*a channel impulse response (CIR) estimate block configured to generate an impulse response signal based on a receive signal that is a single-carrier segment of a mixed carrier signal;*

*a first filter, coupled to the CIR estimate block, configured to filter a signal based on the receive signal according to the generated impulse response signal;*

*a single-carrier processor configured to:*

*process the filtered receive signal, based on the receive signal, to resolve the single-carrier segment of the mixed carrier signal;*

*detect a mixed carrier mode indication in the single-carrier segment; and*

*assert a start indication corresponding to the end of the single-carrier segment; and*

*a multi-carrier processor configured to process a multi-carrier segment of the mixed carrier signal in response to assertion of the start indication.*

*41. The baseband receiver of claim 40, wherein the single-carrier segment is Binary Phase Shift Keying (BPSK) or Quadrature Phase Shift Keying (QPSK) and wherein the multicarrier segment is an orthogonal frequency division multiplexed (OFDM) signal.*

*42. The baseband receiver of claim 40, further comprising:*

*control logic, coupled to the single-carrier processor and the multi-carrier processor, configured to select between single-carrier, multi-carrier and mixed carrier modes of operation;*

*the single-carrier processor configured to process the filtered receive signal of the single-carrier signal in the*

*single-carrier mode of operation and to process the single carrier segment of the filtered receive signal of the mixed carrier signal in the mixed carrier mode of operation; and*

*the multi-carrier processor configured to process a multi-carrier receive signal prior to filtering in the multi-carrier mode of operation and to process the multi-carrier segment of the mixed carrier signal in the mixed carrier mode of operation.*

*43. The baseband receiver of claim 42, wherein the multi-carrier processor is configured to operate in a non-coherent mixed carrier mode in which the multi-carrier processor processes the multi-carrier segment of the receive signal prior to the filtering.*

*44. The baseband receiver of claim 43, wherein the multi-carrier segment includes a synchronization field; and*

*the multi-carrier processor is configured to determine frequency domain equalizer taps from the synchronization field.*

*45. The baseband receiver of claim 44, further comprising at least one selected from the group consisting of gain, phase and timing loops configured to develop gain, phase, frequency and timing adjust parameters; and*

*wherein the multi-carrier processor is configured to be programmable with a selected combination of the at least one of gain, phase, frequency and timing adjust parameters.*

*46. The baseband receiver of claim 45, wherein the multi-carrier processor includes a phase locked loop with a second filter that is configured to be programmable with the frequency adjust parameter; and*

*the multi-carrier processor includes a timing loop that is configured to be programmable with the timing adjust parameter.*

*47. The baseband receiver of claim 45, wherein the single carrier processor is further configured to assert a freeze indication to the at least one of gain, phase and timing loops in response to detecting the mixed carrier mode indication, the freeze indication suspending operation of the at least one of gain, phase and timing loops at the end of the single-carrier segment of the mixed carrier signal;*

*a Fast Fourier Transform (FFT) generator configured to convert the impulse response signal into a frequency response signal for use by a frequency domain equalizer, wherein the frequency domain equalizer is coupled to the FFT generator and is configured to determine multi-carrier equalization signals based on the frequency response signal; and*

*the multi-carrier processor configured to process multi-carrier segments of filtered receive signals using the multicarrier equalization signals in response to assertion of the start indication.*

*48. The baseband receiver of claim 47, wherein the multi-carrier processor is coupled to an output of the first filter via a multiplexer; and*

*the frequency domain equalizer is configured to determine the multi-carrier equalization signals $FEQ(w_k)$ based on the frequency response signal $H(w_k)$ according to equation*

$$FEQ(\omega_k) = \frac{1}{|H(\omega_k)|^2}.$$

*49. The baseband receiver of claim 45, wherein the multi-carrier processor is coupled to an input of the first filter via a CIR Estimate element;*

*the single-carrier processor configured to assert the start indication before the end of the single-carrier segment by a first filter latency period; and*

*the frequency domain equalizer configured to determine the multi-carrier equalization signals $FEQ(w_k)$ based on the frequency response $H(W_k)$ according to equation*

$$FEQ(\omega_k) = \frac{1}{H(\omega_k)}.$$

*50. The baseband receiver of claim 45, wherein the phase loop comprises:*

*a phase error detector, coupled to an output of the first filter, configured to generate a phase error signal;*

*a phase filter, coupled to the phase error detector, configured to receive the phase error signal and generate a phase correction signal; and*

*a phase rotator, coupled in the signal path of the receive signal, configured to adjust the receive signal based on the phase correction signal;*

*wherein the phase correction signal is held constant upon assertion of the freeze indication.*

*51. The baseband receiver of claim 50, wherein the phase error detector is configured to set the phase error signal to zero upon assertion of the freeze indication to hold the phase correction signal constant.*

*52. The baseband receiver of claim 45, wherein the gain loop comprises:*

*a gain error detector, coupled to an output of the first filter, configured to generate a gain error signal;*

*an integrator, coupled to the gain error detector, configured to receive the gain error signal and generate a gain correction signal; and*

*a multiplier, coupled in the signal path of the receive signal, configured to adjust the receive signal based on the gain correction signal;*

*wherein the gain correction signal is held constant upon assertion of the freeze indication.*

*53. The baseband receiver of claim 52, wherein the gain error detector is configured to set the gain error signal to zero upon assertion of the freeze indication to hold the gain correction signal constant.*

*54. The baseband receiver of claim 45, wherein the timing loop comprises a time track block that is configured to receive and adjust timing of the receive signal, and wherein the time track block is configured to suspend tracking adjustments of the receive signal upon assertion of the freeze indication.*

*55. The baseband receiver of claim 45, wherein the multi-carrier processor includes a combiner that is configured to combine the multi-carrier equalization signals from the frequency domain equalizer with the frequency response signal based on a received multi-carrier signal.*

*56. The baseband receiver of claim 45, further comprising:*

*control logic, coupled to the single-carrier processor and the multi-carrier processor,*

*configured to select between single-carrier, multi-carrier and mixed carrier modes of operation;*

*the single-carrier processor configured to process the filtered receive signal of the single-carrier signal in the single-carrier mode of operation and to process the*

*single-carrier segment of the filtered receive signal of the mixed carrier signal in the mixed carrier mode of operation; and*

*the multi-carrier processor configured to process the multi-carrier receive signal prior to filtering in the multi-carrier mode of operation and to process the multi-carrier segment of the filtered receive signal of the mixed carrier signal in the mixed carrier mode of operation.*

*57. The baseband receiver of claim 40, wherein the receive signal is a mixed carrier signal in which the single carrier segment has a spectrum that approximates a multi-carrier spectrum.*

*58. A wireless radio frequency (RF) communication device, comprising:*

*an RF system configured to:*

*convert RF signals from an antenna to baseband signals; and*

*convert the baseband signals to RF signals for transmission via the antenna;*

*a baseband transmitter, coupled to the RF system, configured to:*

*transmit a mixed carrier signal via the RF system by modulating a single-carrier section using a single-carrier modulation and by modulating a multi-carrier section using a multi-carrier modulation; and*

*a baseband receiver, coupled to the RF system, comprising:*

*a channel impulse response (CIR) estimate block configured to generate an impulse response signal based on a receive baseband signal from a RF transceiver, the receive baseband signal comprising a single-carrier segment of a mixed carrier signal;*

*a first filter, coupled to the CIR estimate block, configured to filter a signal based on the receive signal according to the generated impulse response signal;*

*a single-carrier processor, coupled to the CMF, configured to:*

*process the filtered receive signal, based on the receive signal, to resolve the single-carrier section of the mixed carrier signal;*

*detect a mixed carrier mode indication in the single-carrier section; and*

*assert a start signal corresponding to the end of the single-carrier section; and*

*a multi-carrier processor configured to process the multi-carrier section of the mixed carrier signal in response to assertion of the start signal.*

*59. The wireless RF communication device of claim 58, wherein the single-carrier segment is Binary Phase Shift Keying (BPSK) or Quadrature Phase Shift Keying (QPSK) and wherein the multi-carrier segment is an orthogonal frequency division multiplexed (OFDM) signal.*

*60. The wireless RF communication device of claim 58, wherein the baseband receiver includes a single-carrier operating mode in which the single-carrier processor is configured to process filtered receive signals to resolve single-carrier receive baseband signals, and a multicarrier operating mode in which the multicarrier processor is configured to process multi-carrier receive baseband signals.*

*61. The wireless RF communication device of claim 58, further comprising at least one selected from the group consisting of gain, phase and timing loops configured to develop gain, phase, frequency and timing adjust parameters; and*

*wherein the multi-carrier processor is configured to be programmable with a selected combination of the at least one gain, phase, frequency and timing adjust parameters.*

*62. The wireless RF communication device of claim 61, wherein the single-carrier receive processor is configured to assert a freeze signal in response to detecting the mixed carrier mode indication, the freeze signal suspending operation of the at least one gain, phase and timing loops;*

*a Fast Fourier Transform (FFT) block that converts the impulse response signal into a frequency response signal;*

*a frequency domain equalizer that generates multi-carrier equalization signals based on the frequency response signal; and*

*the multi-carrier processor, in response to the start signal, processing the multicarrier section of the filtered receive signal through the suspended at least one gain, phase and timing loops and the first filter and using the multi-carrier equalization signals.*

*63. The wireless RF communication device of claim 58, wherein the baseband receiver further comprises:*

*control logic, coupled to the single-carrier processor and the multi-carrier processor, configured to select between single-carrier, multi-carrier and mixed carrier modes of operation;*

*the single-carrier processor configured to process the filtered receive signal of the single carrier signal in the single-carrier mode of operation and to process the single-carrier segment of the filtered receive signal of the mixed carrier signal in the mixed carrier mode of operation; and*

*the multi-carrier processor configured to process the multi-carrier receive signal prior to filtering in the multi-carrier mode of operation and to process the multi-carrier segment of the filtered receive signal of the mixed carrier signal in the mixed carrier mode of operation.*

*64. The wireless RF communication device of claim 63, wherein the RF transceiver is capable of multi-band operation, wherein the RF system is configured to operate in a first RF frequency band for the single-carrier and mixed carrier modes, and wherein the RF system is configured to operate in a selected one of multiple frequency bands including the first RF frequency band and a second RF frequency band for the multi-carrier mode.*

*65. The wireless RF communication device of claim 64, wherein the first RF frequency band is approximately 2.4 gigahertz (GHz) and wherein the second RF frequency band is approximately 5 GHz.*

*66. The wireless RF communication device of claim 58, wherein the baseband transmitter comprises:*

*a single-carrier transmit processor that is configured to generate a single-carrier signal;*

*a multi-carrier transmit processor that is configured to generate a multi-carrier signal;*

*a digital filter, coupled to the single-carrier transmit processor, that is configured to filter the single-carrier signal to have a power spectrum that approximates a multi-carrier power spectrum; and*

*a signal combiner, coupled to the digital filter and the multi-carrier transmit processor, that is configured to combine the filtered single-carrier signal with the multi-carrier signal while maintaining at least one selected from the group consisting of phase, gain and timing alignment.*

*67. The wireless RF communication device of claim 66, wherein the signal combiner comprises:*

*a phase multiplier that is configured to multiply the multi-carrier signal by a phase of a last portion of the single-carrier signal and provide a rotated multi-carrier signal;*

*a digital combiner that is configured to combine the filtered single-carrier signal and the rotated multi-carrier signal and provide a combined mixed carrier signal; and*

*a soft switch that is configured to select the filtered single-carrier signal until reception of the filtered single-carrier signal is completed, select the combined mixed carrier signal during a transition period, and select the rotated multi-carrier signal at the end of the transition period.*

*68. The wireless RF communication device of claim 67, wherein the single-carrier signal includes consecutive chips according to a predetermined timing interval and wherein the transition period has a duration equivalent to the predetermined timing interval.*

*69. A method of acquiring a mixed carrier signal having a single-carrier segment followed by a multi-carrier segment, comprising:*

*determining a channel impulse response (CIR) estimate while receiving the single-carrier segment of a received baseband signal;*

*filtering a signal based on the received baseband signal based on the determined CIR estimate to provide a filtered baseband signal;*

*processing the filtered baseband signal using a single-carrier processor to acquire the single-carrier segment;*

*detecting a mixed mode carrier identifier in the single-carrier segment and asserting a mixed mode indication; and*

*in response to detecting the mixed mode carrier identifier, processing the received baseband signal using a multi-carrier processor to acquire the multi-carrier segment.*

*70. The method of claim 69, wherein processing the received baseband signal using the multi-carrier processor comprises processing the received baseband signal prior to the step of filtering.*

*71. The method of claim 70, further comprising:*

*determining, by the multi-carrier processor, a channel frequency response estimate from a preamble section of the multi-carrier segment; and*

*filtering the multi-carrier segment based on the determined channel frequency response estimate.*

*72. The method of claim 71, further comprising:*

*determining gain, phase, frequency, and timing adjust parameters of a received baseband signal; and*

*using, by the multi-carrier processor, any selected combination of the gain, phase, frequency and timing adjust parameters as at least one starting parameter for acquiring the multi-carrier segment.*

*73. A method of acquiring a mixed carrier signal having a single-carrier segment followed by a multi-carrier segment, comprising:*

*determining at least one of gain, phase, frequency, and timing adjust parameters of a received baseband signal;*

*determining a channel impulse response (CIR) estimate while receiving the single-carrier segment of the received baseband signal;*

*converting the CIR estimate to a frequency response signal;*

*programming a frequency domain equalizer using the frequency response signal;*

*filtering a signal based on the baseband signal based on the CIR estimate to provide a filtered baseband signal;*

*processing the filtered baseband signal using a single-carrier processor to acquire the single-carrier segment;*

*detecting a mixed carrier mode identifier of the single-carrier segment and asserting a mixed mode indication and a freeze indication;*

*in response to the freeze indication, holding the at least one of gain, phase, frequency and timing adjust parameters constant; and*

*in response to the mixed mode indication, processing the filtered baseband signal with a multi-carrier processor that employs the frequency domain equalizer to acquire the multi-carrier segment.*

*74. The method of claim 73, wherein holding the at least one of gain, phase, frequency and timing adjust parameters constant comprises setting the at least one of gain, phase, frequency and timing adjust parameters to zero.*

*75. A non-transitory computer-readable medium having instructions stored thereon for acquiring a mixed carrier signal having a single-carrier segment followed by a multi-carrier segment that, if executed by a computing device, cause the computing device to perform operations comprising:*

*determining a channel impulse response (CIR) estimate while receiving the single-carrier segment of a received baseband signal;*

*filtering a signal based on the received baseband signal based on the determined CIR estimate to provide a filtered baseband signal;*

*processing the filtered baseband signal using a single-carrier processor to acquire the single-carrier segment;*

*detecting a mixed mode carrier identifier in the single-carrier segment and asserting a mixed mode indication; and*

*in response to detecting the mixed mode carrier identifier, processing the received baseband signal using a multi-carrier processor to acquire the multi-carrier segment.*

*76. The non-transitory computer-readable medium of claim 75, wherein processing the received baseband signal using the multi-carrier processor comprises processing the received baseband signal prior to the step of filtering.*

*77. The non-transitory computer-readable medium of claim 76, wherein the operations further comprise:*

*determining, by the multi-carrier processor, a channel frequency response estimate from a preamble section of the multi-carrier segment; and*

*filtering the multi-carrier segment based on the determined channel frequency response estimate.*

*78. The non-transitory computer-readable medium of claim 77, wherein the operations further comprise:*

*determining gain, phase, frequency, and timing adjust parameters of a received baseband signal; and*

*using, by the multi-carrier processor, any selected combination of the gain, phase, frequency and timing adjust parameters as at least one starting parameter for acquiring the multi-carrier segment.*

* * * * *